US010106330B2

(12) United States Patent
Maines et al.

(10) Patent No.: US 10,106,330 B2
(45) Date of Patent: Oct. 23, 2018

(54) VERY HIGH SPEED LINEAR SORTATION CONVEYOR WITH DYNAMIC RECIRCULATION CAPACITY

(71) Applicant: Intelligrated Headquarters, LLC, Mason, OH (US)

(72) Inventors: Christopher G. Maines, Mason, OH (US); Justin J. Zimmer, Dayton, OH (US); Jason Robert Meta, Dayton, OH (US); Ryan Artz, Mason, OH (US); Brett Alan Hedges, Maineville, OH (US); Adam Stutz, Xenia, OH (US); Raymond R. Neiser, Batavia, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 15/375,900

(22) Filed: Dec. 12, 2016

(65) Prior Publication Data

US 2018/0022555 A1 Jan. 25, 2018
US 2018/0170683 A9 Jun. 21, 2018

Related U.S. Application Data

(63) Continuation-in-part of application No. 15/147,475, filed on May 5, 2016, now Pat. No. 9,795,995, and a
(Continued)

(51) Int. Cl.
*B65G 47/46* (2006.01)
*B65G 43/00* (2006.01)
(Continued)

(52) U.S. Cl.
CPC ........... *B65G 43/00* (2013.01); *B07C 5/36* (2013.01); *B65G 47/46* (2013.01); *B65G 47/684* (2013.01); *B65G 47/766* (2013.01); *B65G 47/844* (2013.01)

(58) Field of Classification Search
CPC ...... B65G 47/844; B65G 47/46; B65G 47/34; B65G 2207/36
(Continued)

(56) References Cited

U.S. PATENT DOCUMENTS 3,361,247 A * 1/1968 Lauzon ............... B65G 47/496
198/370.02
4,711,341 A 12/1987 Yu et al.
(Continued)

FOREIGN PATENT DOCUMENTS

| JP | 2012-111577 A | 6/2012 |
| JP | 2013-095594 A | 5/2013 |
| WO | WO 2004/092042 A1 | 10/2004 |

OTHER PUBLICATIONS

International Search Report and Written Opinion for International Application No. PCT/US2014/041286 dated Sep. 24, 2014.
(Continued)

*Primary Examiner* — James R Bidwell
(74) *Attorney, Agent, or Firm* — Alston & Bird LLP

(57) ABSTRACT

A material handling system includes a very high speed linear sortation conveyor that receives articles at an operating speed of 650 to 700 feet per second (fps) and up to 100 fps with gapping as small as one inch. In one or more embodiments, a recirculation sortation conveyor receives articles that are not diverted by the linear sortation conveyor with dynamic capacity sufficient to handle a high speed shutdown of the linear sortation conveyor. The recirculation sortation conveyor is itself a very high speed linear sortation conveyor having a pusher pre-sort feature that can distribute received
(Continued)

articles at different lateral positions on an endless conveyor to align with more than one recirculation sortation conveyors that may be operating at a slower operating speed. In an exemplary embodiment, the recirculation sortation conveyor has a divert section for diverting articles to a divert target on a lateral side.

21 Claims, 13 Drawing Sheets

Related U.S. Application Data continuation-in-part of application No. 14/298,165, filed on Jun. 6, 2014, now Pat. No. 9,738,455.

(60) Provisional application No. 62/363,887, filed on Jul. 19, 2016, provisional application No. 62/308,401, filed on Mar. 15, 2016, provisional application No. 62/157,501, filed on May 6, 2015, provisional application No. 61/981,413, filed on Apr. 18, 2014, provisional application No. 61/832,321, filed on Jun. 7, 2013.

(51) Int. Cl.
  *B65G 47/68* (2006.01)
  *B65G 47/76* (2006.01)
  *B07C 5/36* (2006.01)
  *B65G 47/84* (2006.01)

(58) Field of Classification Search
  USPC .................................................. 198/370.02
  See application file for complete search history.

(56) References Cited

U.S. PATENT DOCUMENTS

| | | | |
|---|---|---|---|
| 4,717,011 A * | 1/1988 | Yu ........................ | B65G 47/844 198/370.02 |
| 4,732,259 A | 3/1988 | Yu et al. | |
| 4,884,677 A | 12/1989 | Yu et al. | |
| 5,613,591 A | 3/1997 | Heit et al. | |
| 6,139,240 A * | 10/2000 | Ando ................... | B65G 47/844 198/370.02 |
| 6,478,144 B1 | 11/2002 | Sweazy | |
| 6,860,376 B1 | 3/2005 | Heit et al. | |
| 7,121,398 B2 | 10/2006 | Affaticati et al. | |
| 7,441,646 B2 | 10/2008 | Heit et al. | |
| 7,516,835 B2 * | 4/2009 | Neiser ................... | B65G 47/844 198/370.02 |
| 7,909,155 B2 | 3/2011 | Lupton et al. | |
| 8,886,356 B2 * | 11/2014 | Magato .................. | B65G 43/08 700/213 |
| 9,037,290 B2 * | 5/2015 | Neiser .................... | B65G 43/10 370/397 |
| 9,038,809 B2 | 5/2015 | Wilkins et al. | |
| 9,199,802 B2 * | 12/2015 | Neiser .................... | B65G 43/10 |
| 2003/0079971 A1 | 5/2003 | Veit | |
| 2006/0060447 A1 | 3/2006 | Ramaker et al. | |
| 2009/0065330 A1 | 3/2009 | Lupton et al. | |
| 2009/0145723 A1 | 6/2009 | Ogawa | |
| 2010/0030373 A1 | 2/2010 | Lee et al. | |
| 2011/0240439 A1 | 10/2011 | Rompe | |
| 2014/0244029 A1 | 8/2014 | Thomas | |
| 2014/0364998 A1 | 12/2014 | Neiser et al. | |

OTHER PUBLICATIONS

International Search Report and Written Opinion for International Application No. PCT/US2016/031179 dated Oct. 5, 2016.
International Search Report and Written Opinion for International Application No. PCT/US2017/042480 dated Oct. 18, 2017.

* cited by examiner

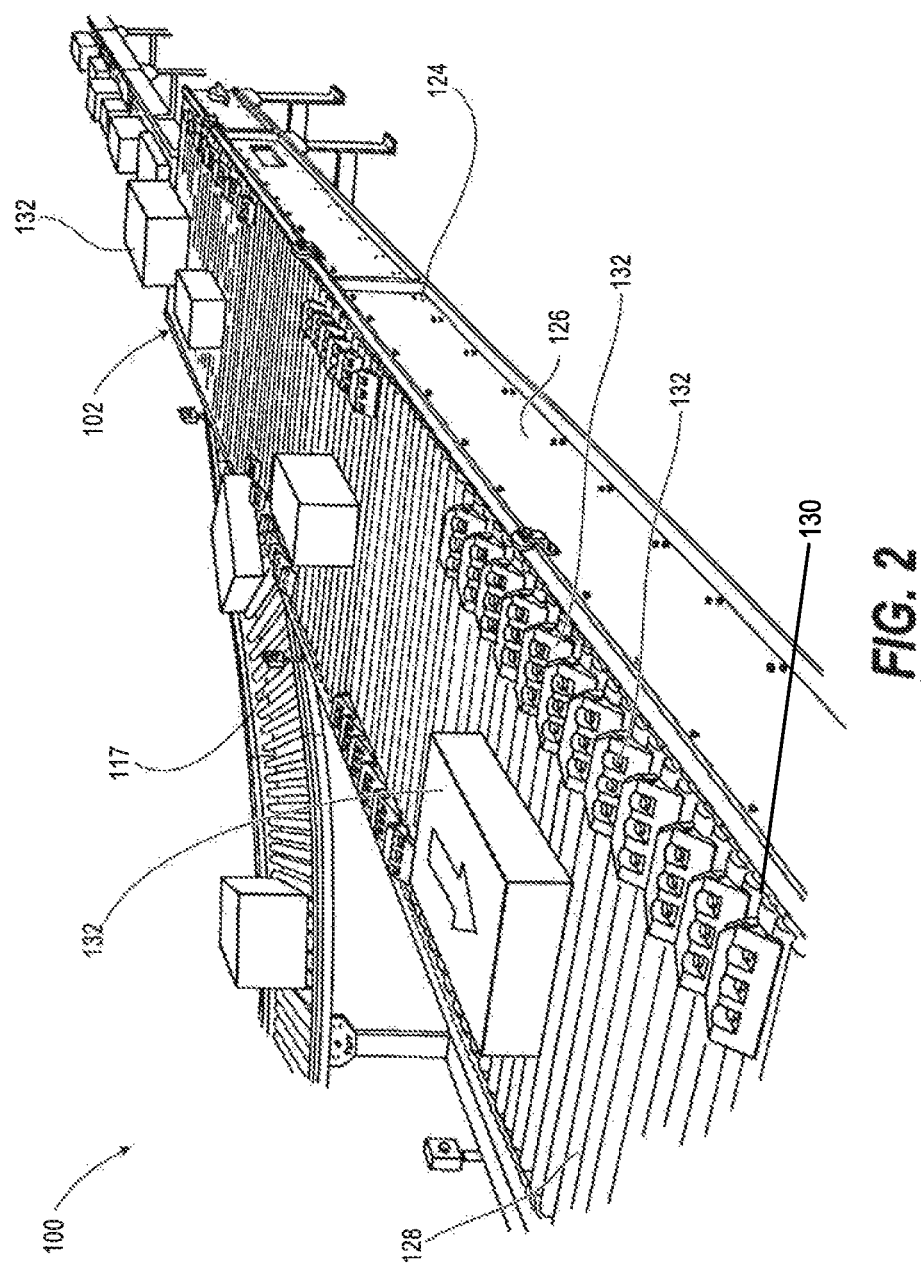

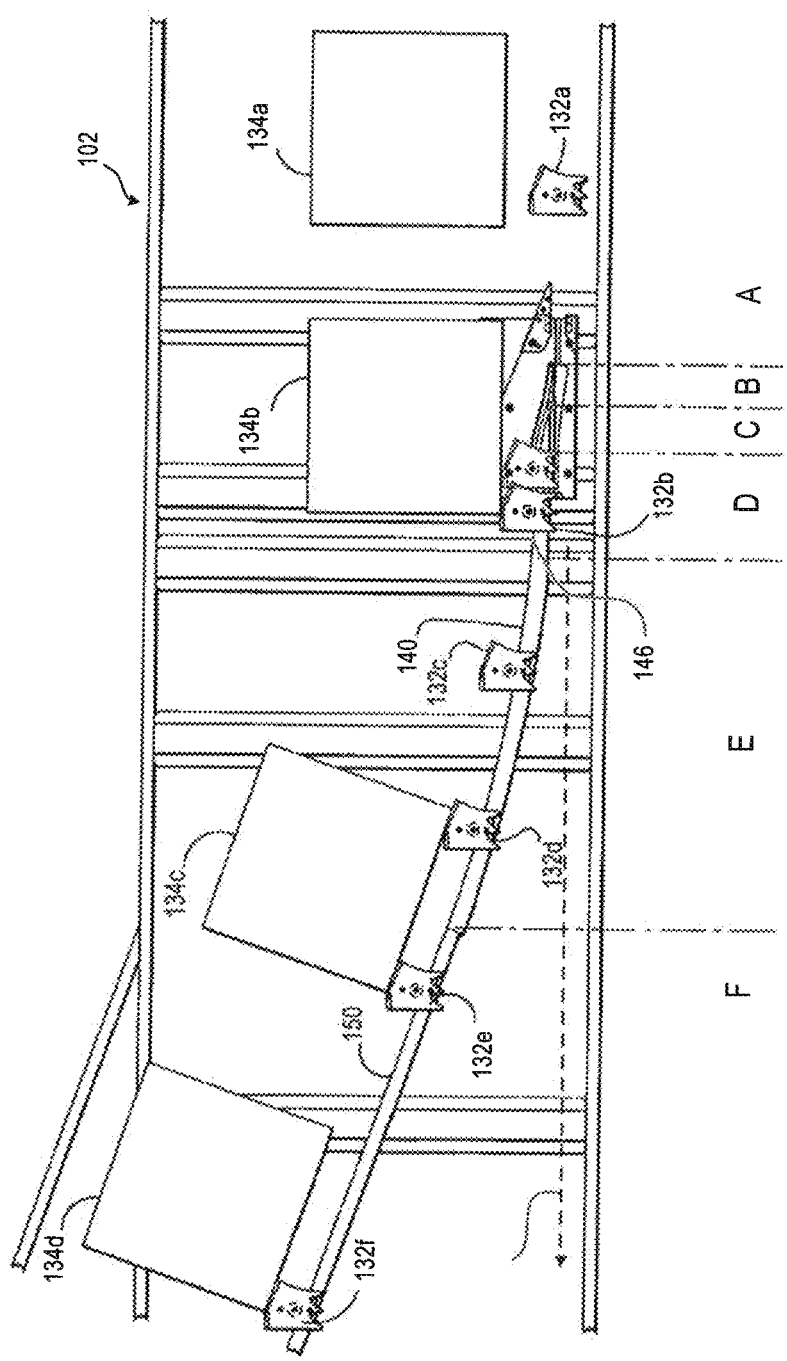

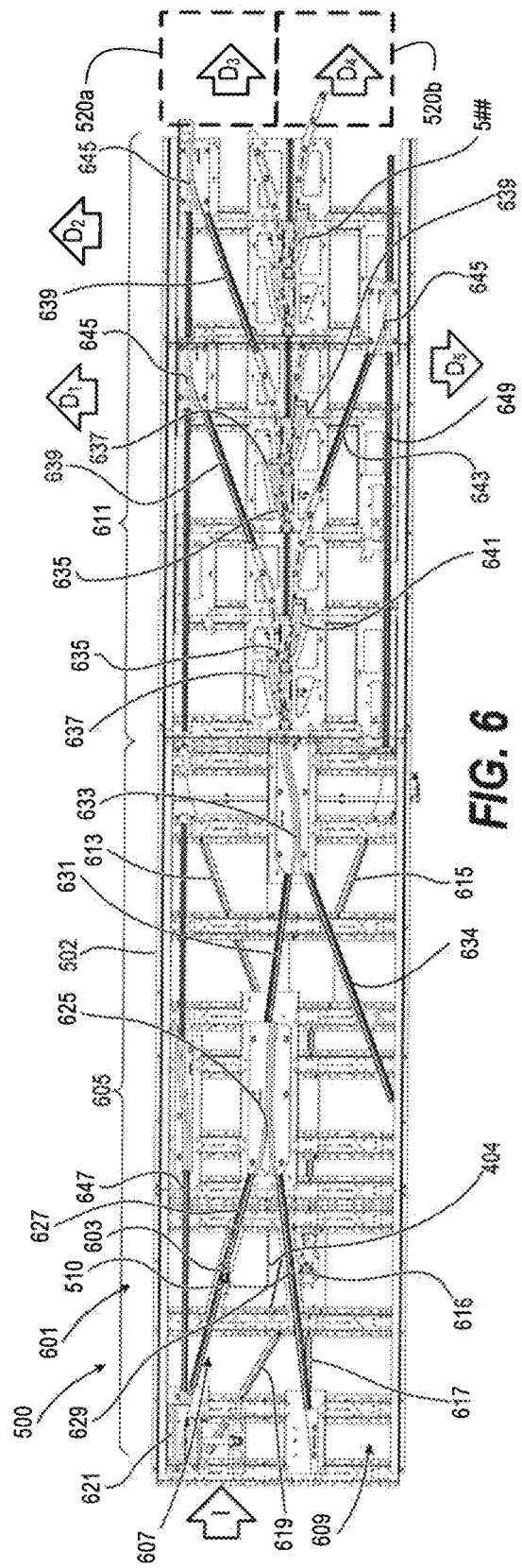

US 10,106,330 B2

VERY HIGH SPEED LINEAR SORTATION CONVEYOR WITH DYNAMIC RECIRCULATION CAPACITY

CLAIMS OF PRIORITY

The present application claims the benefit of U.S. Provisional Patent Application Ser. No. 62/363,887 filed 19 Jul. 2016 and entitled "Very High Speed Linear Sortation Conveyor with Dynamic Recirculation Capacity", the disclosure of which is hereby incorporated by reference in its entirety.

The present application is a Continuation-in-Part (CIP) of (i) U.S. Nonprovisional patent application Ser. No. 15/147,475 filed on 5 May 2016 entitled "High-Speed, Dual-Sided Shoe Sorter with Offset Induct", which in turn claims the benefit of (ii) U.S. Provisional Patent Application No. 62/157,501 filed on 6 May 2015 and entitled "Dual Sided Shoe Sorter with Offset Induction Lane"; and (iii) U.S. Provisional Patent Application No. 62/308,401 filed on 15 Mar. 2016 and entitled "High-Speed Linear Sortation Conveyor with Selective Top Reinduction", all three assigned to the assignee hereof, and all three hereby expressly incorporated by reference in their entirety.

The present application is a CIP of (iv) of U.S. patent application Ser. No. 14/298,165 filed on 6 Jun. 2014 and entitled "Conveyor Speed Control", which in turn claims the benefit of (v) U.S. Provisional Patent Application No. 61/981,413 filed on 18 Apr. 2014 and entitled "Intelligent Speed Controls In Material Handling Systems Including A Singulator"; and (vi) U.S. Provisional Patent Application No. 61/832,321 filed on 7 Jun. 2013 and entitled "Usage-Driven Sorter Speed Control", the disclosures of all three of which are hereby expressly incorporated by reference in their entirety.

BACKGROUND

1. Technical Field

The present disclosure relates generally to material handling system that incorporate linear sortation conveyors, also known as shoe sorters, and their components, and is particularly related to controlling high speed merging, sortation, and recirculation by the material handling system.

2. Description of the Related Art

Sortation conveyors are essential components of high volume distribution and fulfillment operations. A sortation conveyor system typically conveys and distributes articles along moving conveyor surfaces, and diverts selected articles onto a particular conveying branch. Sortation conveyors often employ a plurality of pusher elements which may be selectively moved across the conveying surface in order to divert an article from the primary conveying path and onto a secondary conveying branch. Sortation conveyors have a primary conveying surface which can comprise an endless conveyor belt loop formed from plurality of transverse rollers or slats. When it is necessary to direct an article from the moving conveying path and onto a secondary conveying branch, a switch or switch mechanism is actuated to cause an assigned set of pusher elements to be diverted across the moving conveyor surface. The transversely diverted pusher elements engage the article to the secondary conveying branch, such as a takeaway conveyor. Sortation conveyors often use divert tracks or guide surfaces which direct the assigned set of pusher elements laterally across the conveying surface, while pusher elements which are not assigned pass by the divert tracks and continue to travel along the conveying surface in their set position.

Higher speed linear sortation conveyors can provide for greater throughput. U.S. Pat. No. 7,516,835 B2 ("Soft Touch patent"), the disclosure of which is hereby incorporated in its entirety, provides a high speed sliding shoe sortation conveyor. A divert guide is configured to guide shoes or pushers to engage articles disposed on an endless conveying surface at an initial impact which does not result in an out of control situation even at high speeds. The divert guide path is disposed at a plurality of divert angles, and guide pushers to engage articles at a low initial contact divert angle and first lateral speed and to accelerate the articles to a final divert angle and second, higher, lateral speed. The pushers may be undergoing lateral acceleration at the time initial contact is made with the articles. Articles are inducted onto the endless conveyor surface close to the pushers so that the pushers initially contact a selected article at relatively low lateral speed and then smoothly accelerate the article to the divert location.

While the Soft Touch patent enabled linear shoe sortation of articles such as totes and cartons as higher rates than previously achieved, what has long been needed was an overall material handling solution that achieved greater throughputs.

BRIEF DESCRIPTION OF THE FIGURES

FIG. 2 illustrates a perspective view of the linear sortation conveyor of FIG. 1, according to one or more embodiments;

FIG. 3B illustrates a plan view of a pin guide assembly of the linear sortation conveyor of FIG. 3A with pushers and articles, according to one or more embodiments;

FIG. 6 illustrates a top view of pin guide assembly of the example recirculation sortation conveyor of FIG. 5, according to one or more embodiments;

FIG. 7 illustrates a top view of an endless apron of the example recirculation sortation conveyor having pushers that interact with the pin guide assembly of FIG. 6 to at least pre-sort articles, according to one or more embodiments;

DETAILED DESCRIPTION

Figure 1A:
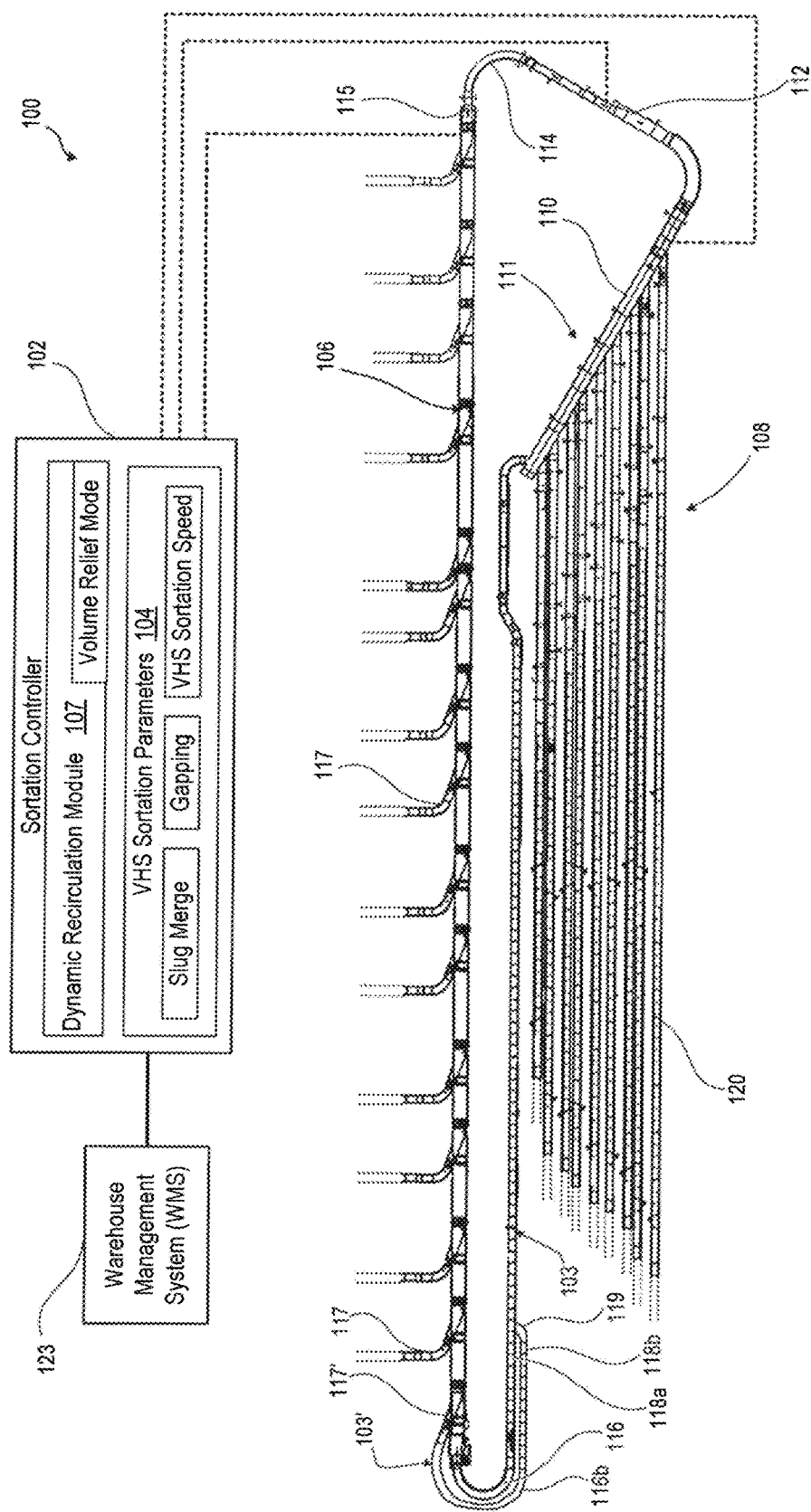
FIG. 1A illustrates a diagrammatic top view of a material handling system that includes a very high speed (VHS) linear sortation conveyor with two recirculation paths and with a conceptual block diagram of a sorter controller that configures the linear sortation conveyor for very high speed operation, according to one or more embodiments.

In one aspect, the present disclosure provides a method of dynamic recirculation control for a linear sortation conveyor of a material handling system. In one or more embodiments, the method includes (i) receiving divert destination assignments for a train of articles conveyed onto a linear sortation conveyor that has a primary recirculation path and a secondary recirculation path. At least one of the primary and secondary recirculation paths are reachable by a particular article by lateral repositioning on an endless apron of the linear sortation conveyor. The method includes (ii) determining whether the particular article conveyed on the linear sortation conveyor has an impending recirculation status; and (iii) in response to determining that the particular article has the impending recirculation status, the method includes assigning the particular article to one of primary and secondary recirculation paths.

In one aspect, the present disclosure provides a material handling system that includes a linear sortation conveyor upstream of a recirculation sortation conveyor. The linear sortation conveyor includes an elongate frame comprising a pair of lateral side frames. An endless apron is supported for movement on the elongate frame to define a top conveying run and a bottom return run. More than one pusher is received for lateral movement across the endless apron. More than one divert conveyor positioned respectively along at least one lateral side of the elongate frame to receive articles diverted by one or more pusher from the distally-moving top conveying run of the endless apron. A plurality of switches selectively divert articles to one of a plurality of divert locations. More than one switch is associated with respective divert locations that are in turn associated with the more than one divert conveyor. The linear sortation conveyor also includes more than one divert guide path. Each respective divert guide path of the more than one divert guide path is disposed downstream of a respective associated more than one switch to receive a selected pusher diverted by a selected switch into the selected divert guide path to divert a selected article. Each respective divert guide path includes an arcuate portion having a continuously increasing slope without a breakpoint to laterally accelerate the diverted article without an abrupt initial force being applied. The recirculation sortation conveyor dynamically recirculates articles that are not diverted by a linear sortation conveyor of the material handling system. the recirculation sortation conveyor includes an elongate frame comprising a pair of lateral side frames. An endless apron is supported for longitudinal movement on the elongate frame to define a top conveying run and a bottom return run. The endless apron of the recirculation sortation conveyor is positioned downstream of a linear sortation conveyor to receive at an offset lateral position a train of articles that are not diverted by the linear sortation conveyor. More than one pusher is received for lateral movement across the endless apron transverse to the longitudinal movement. Each pusher has a pin extending below the top conveying run. A pin guide assembly is coupled between the elongate lateral frames. The pin guide assembly is upwardly presented to selectively receive the pin of respective more than one pusher. The pin guide assembly includes an upstream pre-sort section that positions the articles selectively from the offset lateral portion to an opposite lateral portion of the top conveying run. Two or more recirculation sortation conveyors are positioned downstream of the recirculation sortation conveyor respectively to receive articles presorted to one of the offset lateral position and the opposite lateral position. A scanner is positioned to detect position and identifying indicia of a train of articles conveyed onto the linear sortation conveyor. A sortation controller is in communication with a warehouse execution system, the scanner, the linear sortation conveyor, and the recirculation sortation conveyor. The sortation controller executes computer-readable instructions on a processor to configure the material handling system to perform operations: (i) scan the train of articles conveyed onto linear sortation conveyor, (ii) communicate the identifying indicia to the warehouse execution system and receive an assigned divert location for each article; (iii) switch a selected divert switch for an assigned divert location for each article; (iv) determine whether any article was not diverted on the endless apron; and (v) in response to determining whether any article was not diverted on the endless apron, assign the article to one of two or more recirculation sortation conveyors and communicate the assignment to the recirculation sortation conveyor.

In another aspect, the present disclosure provides a recirculation sortation conveyor that dynamically recirculates articles that are not diverted by a linear sortation conveyor of a material handling system. In one or more embodiments, the recirculation sortation conveyor includes an elongate frame comprising a pair of lateral side frames. The recirculation sortation controller includes an endless apron supported for longitudinal movement on the elongate frame to define a top conveying run and a bottom return run. The endless apron is positioned downstream of a linear sortation conveyor to receive at an offset lateral position a train of articles that are not diverted by the linear sortation conveyor. The recirculation sortation conveyor includes more than one pusher received for lateral movement across the endless apron transverse to the longitudinal movement. Each pusher has a pin extending below the top conveying run. A pin guide assembly is coupled between the elongate lateral frames and upwardly presented to selectively receive the pin of respective more than one pusher. The pin guide assembly includes an upstream pre-sort section that positions the articles selectively from the offset lateral portion to an opposite lateral portion of the top conveying run. Two or more recirculation sortation conveyors are positioned downstream of the recirculation sortation conveyor respectively to receive articles presorted to one of the offset lateral position and the opposite lateral position.

In an additional aspect, the present disclosure provides a sortation controller of a material handling system that dynamically assigns undiverted articles to a recirculation conveyor. In one or more embodiments, the sortation controller includes a device interface that is in communication with a source of information for undiverted articles on a linear sortation conveyor that are being conveyed onto a recirculation sortation conveyor. The sortation controller includes a processor subsystem in communication with the device interface and a pin guide assembly of the recirculation sortation conveyor. The processor subsystem configures the recirculation sortation conveyor to: (i) determine a predicted induction position of an undiverted article on an endless apron of the recirculation sortation conveyor; (ii) determine a capacity of at two recirculation conveyors that receive articles from a respective lateral side of the recirculation sortation conveyor; and (iii) assign a pre-sort section of the pin guide assembly to position the undiverted article on a selected lateral side of the endless apron corresponding to a selected one of two recirculation conveyors having available capacity.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations FIG. 1A illustrates a material handling system 100 that incorporates an improvement of a sortation controller 102 using very high speed (VHS) parameters 104 such that a linear sortation conveyor 106 can operate at 650 to 700 feet per minute (fpm) or faster to 1000 fpm. The sortation conveyor 102 has a primary recirculation path 103 off the end of the linear sortation conveyor 102 and a secondary recirculation path 103' to handle peak levels of recirculation that could possibly occur at the higher operating speeds. The sortation controller 102 can execute a dynamic recirculation module 107 that utilizes the secondary path 103' as a volume relief mode when the primary recirculation path 103 has insufficient capacity. Diverting at this rate is handled by the previously incorporated technology described in the Soft Touch patent. An accumulation section 108, merge conveyor 110 of a slug merge section 111, gapping conveyor 112, and induction conveyor 114 operate according the VHS parameters 104. These VHS parameters 104 provide sufficient numbers of articles to the linear sortation conveyor 106 for a demonstrated sustained effective rate of four hundred (400) articles per minute based on eighteen (18) inch square corrugated totes as measured at a scanner 115 on the induction conveyor 114. A primary recirculation curve conveyor 116 receives articles that are not diverted by the linear sortation conveyor 106 to any of more than one divert conveyor 117. The recirculation curve conveyor 116 and a downstream recirculation accumulation conveyor 118 provide sufficient operating speed to accommodate recirculation volumes up to a certain level. In some scenarios, the linear sortation conveyor 106 can be conveying a larger volume than could be accommodated by the primary recirculation curve conveyor 116. A last divert conveyor 117' of the linear conveyor 106 feeds a portion of the recirculation volume to a secondary recirculation curve conveyor 116' that in turn accumulates recirculation volume on a secondary recirculation accumulation conveyor 118' that is merged onto the downstream recirculation accumulation conveyor 118 at an angled merge conveyor 119. The sortation controller 102 keeps the secondary recirculation path 103' empty when possible due to the lower capacity for accumulation as compared to the primary recirculation path 103. For clarity, recirculation accumulation conveyor 118 terminates an upstream end of the merge conveyor 110. However, an installed material handling system 100 that demonstrated the sustained VHS operation terminated the recirculation curve conveyor 116 on one of nine (9) accumulation conveyors 120 of the accumulation section 108. Each accumulation conveyor 118 terminates at a staging conveyor 122 operable to accelerate articles to a merging speed.

VHS parameters 104 include the following TABLES 1-5. VHS parameters 104 for gapping by gapping conveyor 112 are provided in TABLE 1:

TABLE 1

| Rate | Speed | Gap Requested |
| --- | --- | --- |
| 400 articles per minute | 685 to 595 feet per minute | 1 inch |
| 360 articles per minute | 680 to 591 feet per minute | 1 inch |
| 330 articles per minute | 650 to 565 feet per minute | 4 inches |
| Ratio: 1.15:1 | | |

VHS parameters 104 for conveying by induction conveyor 114 are provided in TABLE 2:

TABLE 2

| Rate | Speed |
| --- | --- |
| 400 articles per minute | 700 feet per minute |
| 360 articles per minute | 680 feet per minute |
| 330 articles per minute | 650 feet per minute |

VHS parameters 104 for sorting by linear sortation conveyor 106 are provided in TABLE 3:

TABLE 3

| Rate | Speed |
| --- | --- |
| 400 articles per minute | 700 feet per minute |
| 360 articles per minute | 680 feet per minute |
| 330 articles per minute | 650 feet per minute |

VHS parameters 104 for recirculating by recirculation curve conveyor 116 are provided in TABLE 4:

TABLE 4

| Rate | Speed |
| --- | --- |
| 400 articles per minute | 600 feet per minute |
| 360 articles per minute | 600 feet per minute |
| 330 articles per minute | 600 feet per minute |

VHS parameters 104 for accumulation by recirculation accumulation conveyor 118 are provided in TABLE 5:

TABLE 5

| Rate | Speed |
| --- | --- |
| 400 articles per minute | 400 feet per minute |
| 360 articles per minute | 400 feet per minute |
| 330 articles per minute | 400 feet per minute |

Sortation controller 102 can dynamically speed up and slow down the material handling system 100 in accordance with detected upstream and downstream throughput issues as conveyed by a warehouse management system (WMS) 123. For example, the sortation controller 102 can include features as the previously incorporated by reference U.S. Publ. No. US 2014 0364998 A1 filed in U.S. patent application Ser. No. 14/298,165. Accumulation conveyor 120 can operate with effective gapping control at higher speeds by utilizing commercialized technology described in U.S. Pat. No. 9,037,290 or U.S. Pat. No. 9,199,802, the disclosures of which are hereby incorporated by reference in their entirety. Merge conveyor 110 can incorporate high speed slug release features and may additionally be capable of reverting to a zipper merge mode when a limited number of accumulation conveyors 120 are active as described in U.S. Pat. No. 8,886,356, the disclosure of which is hereby incorporated by reference in its entirety. In addition to the Soft Touch patent, the linear sortation conveyor 106 can include slat sortation features as disclosed in PCT International Application No. WO 2004/092042 A1, the disclosure of which is hereby incorporated by reference in its entirety. The linear sortation conveyor 106 can include pushers as disclosed in U.S. Pat. Nos. 6,860,376 and 7,441,646, the disclosures of which are hereby incorporated by reference in their entirety. All of the aforementioned U.S. issued patents and pending patent applications are assigned to the Applicant.

Figure 1B:
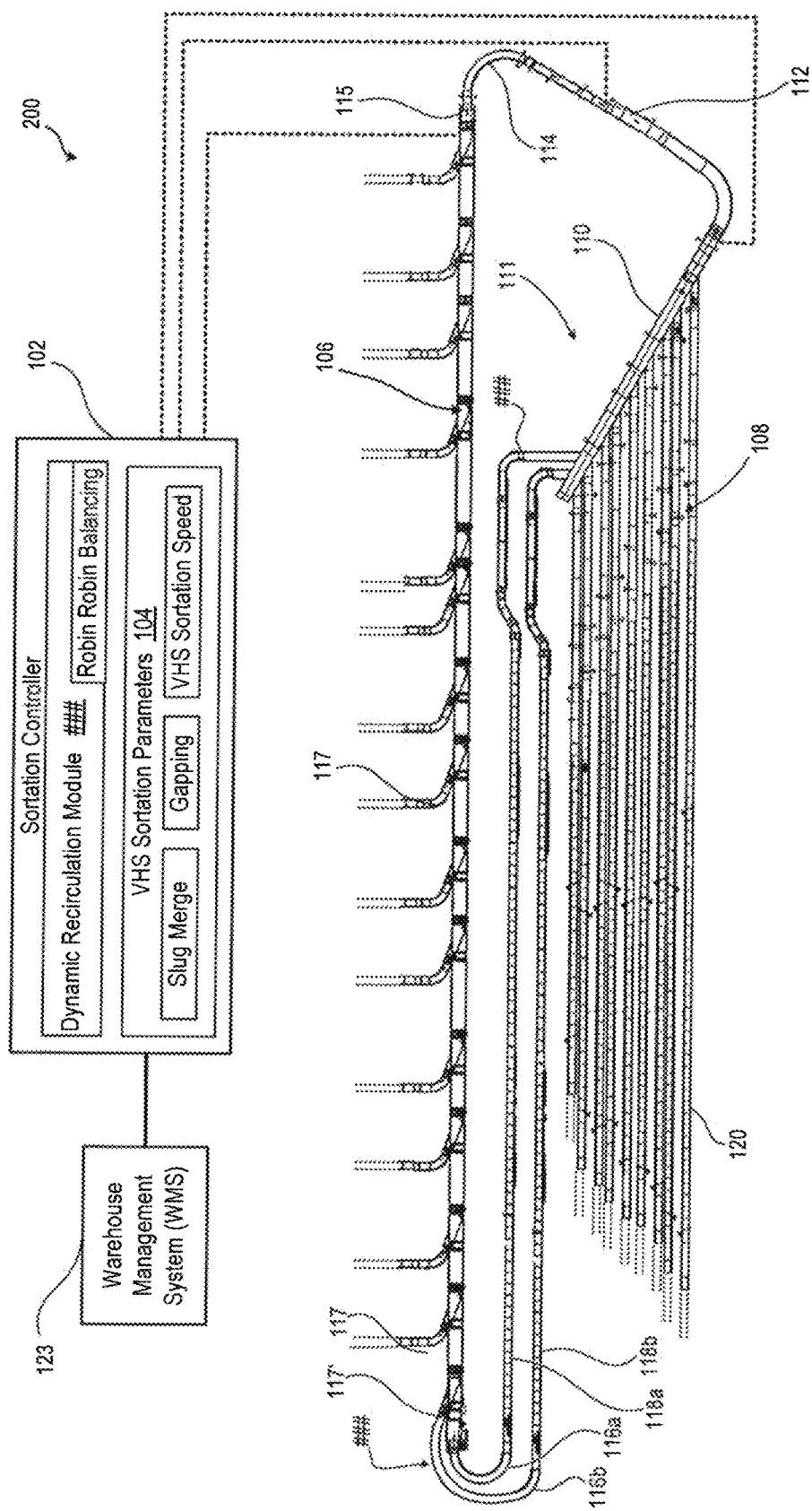
FIG. 1B illustrates a diagrammatic top view of a material handling system that includes a VHS linear sortation conveyor with two balanced recirculation paths and with a conceptual block diagram of a sorter controller that configures the linear sortation conveyor for very high speed operation, according to one or more embodiments.

FIG. 1B illustrates a material handling system 200 similar to the material handling system 100 (FIG. 1) that incorporates an improvement of a sortation controller 102 using very high speed (VHS) parameters 104 such that a linear sortation conveyor 106 can operate at 650 to 700 feet per minute (fpm) or faster to 1000 fpm. The sortation conveyor 102 has a primary recirculation path 103 off the end of the linear sortation conveyor 102 and a secondary recirculation path 103" from the last divert conveyor 117' to handle peak levels of recirculation that could possibly occur at the higher operating speeds. The sortation controller 102 can execute a dynamic recirculation module 107 that utilizes the secondary recirculation path 103" in a balanced, round robin mode with the primary recirculation path 103 since the primary and secondary recirculation paths 103, 103" have about the same accumulation capacity.

FIG. 2 illustrates the linear sortation conveyor 102 has an elongate frame 124 including a pair of lateral side frames 126. An endless apron 128 formed of lateral slats 130 are supported for movement on the elongate frame 124. The endless apron 128 has a top conveying run and a bottom return run. Shoes or pushers 132 are received for lateral movement across the endless apron 128. Divert conveyors 117 are positioned respectively along at least one lateral side of the elongate frame 124 to receive articles 134 diverted by one or more pushers 132 from the distally-moving top conveying run of the endless apron 128. Articles 132 can be containers, totes, boxes, cartons, bags, pouches, unitarily packaged products, etc.

Figure 3A:
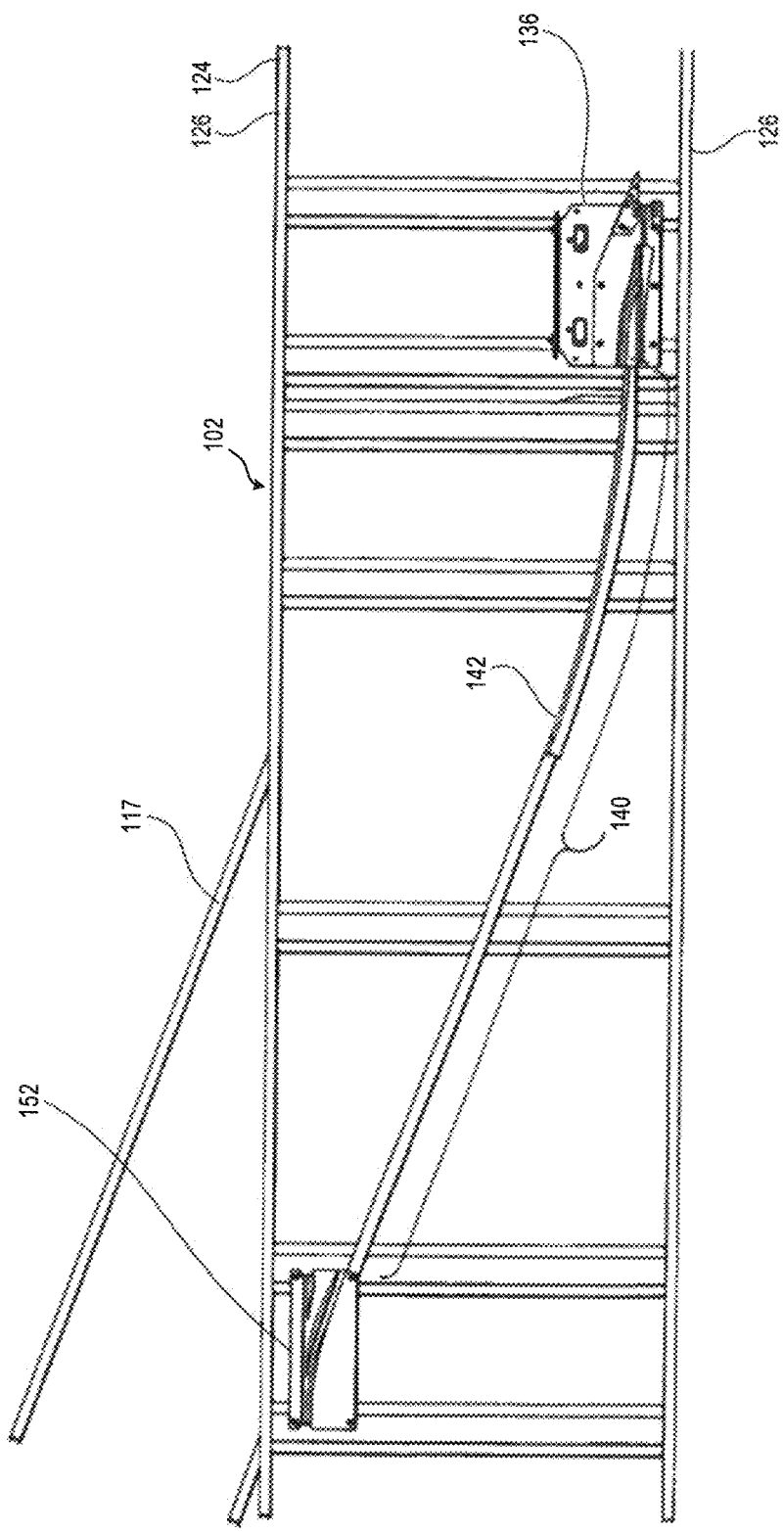
FIG. 3A illustrates a plan view of a pin guide assembly of the linear sortation conveyor of FIG. 1, with the conveying surface and pushers omitted, according to one or more embodiments.

FIG. 3A illustrates a pin guide assembly 135 that includes plurality of switches 136 that lie below the top conveying run of the endless apron 128. The switches 136 selectively divert articles 134 (FIG. 2) to one of a plurality of divert locations 138 that are each associated with a divert conveyor 117. Respective divert guide paths 140 are disposed downstream of an associated switch 136 to receive a downwardly extending pin (not shown) from a selected pusher 132 (FIG. 2). Diverted by the selected switch 136, the particular pusher 132 follows the selected divert guide path 140 to divert a selected article 134 (FIG. 2). Each respective divert guide path 140 has an arcuate portion 142 having a continuously increasing slope without a breakpoint to laterally accelerate the diverted article 134 (FIG. 2) without an abrupt initial force being applied.

FIG. 3B illustrates articles 134a-134d being sorted by the linear sortation conveyor 102 with article 134d being farthest downstream. The pin guide assembly 135 interacts with selected pushers 132a-132f to divert the articles 134a-134d. Pushers 132a-132f are not adjacent to each other and diverted pushers there between have been omitted for clarity. Pusher 132a is illustrated traveling along the home or charge path indicated generally by line 144. Unless diverted at switch 136, pusher 132a travels along the home path downstream of switch 136. Pusher 132b has been diverted and is traveling along straight section 146 of divert guide path 140. Pushers 132c and 132d are traveling along arcuate portion 142. As illustrated, pusher 132c is traveling at a lower divert angle than pusher 132d. Pushers 132e and 132f are traveling along straight section 150, at the final divert angle. A set of diverted pushers for article 134c may include additional pushers (not shown) between pushers 132d and 132e, as well as pushers located upstream and/or downstream thereof, or may just include the two pushers 132d and 132e illustrated. Since pusher 132d is traveling along arcuate portion 142, some pushers in between pushers 132d and 132e are likely bridged. By the time a pusher 132a-132d reaches reentry 152 (FIG. 2B), the action of the pusher 132a-132f on the article 134a-134d is essentially complete. The combination of the location and configuration of divert conveyor 117, the lateral speed of the article 134a-134d, and the action of any pushers 132a-132f still acting on the article 134a-134d, will result in the article 134a-134d traveling onto divert conveyor 117 to complete the divert.

In zone A, upstream of switch 136, the pushers 132a-132f are traveling straight in the home or charge path. In zone B, sets of one or more pushers 132a-132f are selectively diverted from a home path 154 by switch 136, being guided on the pin from 0° to 20° through a small radius. In zone C, the angle is reduced from 20° to 3° relative to the longitudinal direction. The pushers 132a-132f are guided through as large a radius as feasible, given length constraints. Up to this point, there preferably has been no contact with any articles 134a-134d on the conveying surface, with each pusher 134a-134d being primarily guided by its pin. Article 134a is positioned to be spaced laterally away from the charge or home path 154 of the pusher 132a by a nominal distance of 3 inches. By the end of zone C, the pushers of the diverted set of pushers are close to but have not necessarily contacted the article 134b which is laterally aligned with the diverted set of pushers 132b.

In zone D, the initial contact is made between the diverted set of pushers 132b and the article 134b being diverted. Within this initial contact zone, the article 134b being diverted is initially contacted by at least one of the pushers of the diverted set of pushers 132b.

As previously mentioned, each carton is preferably positioned to the switch side of linear sortation conveyor 106, being single file and edge aligned such that the edge of the article 134 is parallel to the longitudinal direction. Differently positioned article 134 may limit the effectiveness: In the depicted embodiment, the system is designed for maximum effectiveness with article 134 being edge aligned and spaced a nominal distance of three (3) inches from the edge of the pushers 132 traveling along the home path. In the depicted embodiment, the contact zone falls within zone D, such as along straight section 146, with the divert angle of the pusher making initial contact being 3°. It is noted that within a linear portion of the divert guide path, the pushers have a constant lateral speed and thus no lateral acceleration.

The length and angle of zone D is calculated to produce initial engagement between the diverted pushers and the laterally aligned cartons being diverted within zone D. It is noted that the straight section of zone D may be omitted, with arcuate portion 142 mating directly with exit section 8g, with the divert angle at which the initial pusher to contact the carton is traveling when it initially contacts the carton, also referred to as the initial contact divert angle, being low enough that the impact between the pushers and the cartons does not result in an out-of-control situation.

The initial engagement should preferably be as gentle as possible, such that the force with which the carton is contacted when divert of the carton is initiated is sufficiently low enough to maintain control throughout the entire range of longitudinal speeds at which the sortation conveyor operates. Article 134 under control during divert reliably and repeatably reach the divert, and the articles 134 are reliably not rotated substantially beyond the final divert angle, upset or toppled. Control in a material handling system 100, configured according to the teachings hereof to maintain control of articles being diverted at high speeds, is determined by the articles 134 for which the material handling system 100 is used. A material handling system 100 does not lack control at operating speeds because cartons for which the system is not designed, or cartons for which the system is not typically used, cannot be diverted under control. For example, the inability of a linear sortation conveyor 106 constructed in accordance with the present innovation to control unique cartons which are different from the articles 134 for which the linear sortation conveyor 106 was designed or is used, does not mean that the sortation conveyor does not maintain control of articles 134 being diverted. The measure of control is that of the articles 134 for which the system is designed or used.

When the initial contact occurs while pushers are traveling along an arcuate path, the pusher is being laterally accelerated upon initial contact. The acceleration rate or rates of at least the first pusher 132 of the diverted set of pushers to contact the carton being diverted must be sufficiently low enough to maintain control throughout the entire range of longitudinal speeds at which the linear sortation conveyor 106 functions. The present innovation is configured to minimize the maximum impact speed of the pushers 132 with the articles 134, resulting in a low initial impact force.

Any article 134 being diverted must be laterally accelerated from its zero lateral speed to its final lateral speed. Each article 134 being diverted by the present innovation is laterally accelerated, whether initial contact occurs in a linear portion of the divert guide path 140 where the pushers 132 have no lateral acceleration, such as that defined by straight section 146, or in an arcuate portion of the divert guide path where the pushers are being laterally accelerated, such as that defined by arcuate portion 142. It is noted that "chatter", minor fluctuations in lateral speed or lateral acceleration resulting from variation in longitudinal speed, tolerances and loading, are excluded from consideration.

Although bridging can occur even if the initial contact zone portion is linear and followed by a linear divert guide path, zone D is designed to generally have the initial contact and therefore initial impact of the pushers on the cartons occur within zone D, although some pushers may have initial contact within zone E or F, depending on bridging. The divert angle of zone D functions to minimize lateral speed of pushers when they initially contact a carton. Even if bridging occurs, initial contact between a diverted set of pushers (the first contact by any of the diverted set) occurs at low lateral speed. The impact force results from the difference in lateral speed between the carton and the pushers: Since the cartons generally have no lateral speed prior to initiation of divert, the impact force generally is the result of only the lateral speed of the pusher.

Even if all of the diverted set of pushers in zone D are in engagement with the diverted carton by the time the leading pusher reaches the end of zone D, the diverted article 134 can bridge intermediate pushers 132 within the diverted set in zone E with the arcuate divert guide path. Such bridging also occurs if the initial contact zone portion is arcuate.

In the embodiment depicted, the direction of travel of pushers 132 traveling in zone E begins at 3° and ends at 20°. In zone E, the article 134 continues to be rotated, until the trailing edge of the carton reaches the end of zone E, at which location the rotation of the carton is completed, usually matching the final divert angle of straight section 150, which is 20° in the depicted embodiment. Arcuate portion 142 causes the pushers to gradually, not necessarily constantly, rotate and laterally accelerate the cartons, producing low forces there between. The acceleration is preferably below 1 g, and in the depicted embodiment it is less than 0.3 g. Without being limited thereto, an arcuate portion 142 that limits the lateral acceleration of pushers when in contact with cartons to less than 0.4 g will result in desirable improvement in control. By way of examples, an arcuate section with a 15 foot radius, having a final divert angle of 20°, operating at 650 feet per minute results in an average lateral acceleration of about 0.25 g, with a maximum lateral acceleration of about 0.277 g; an arcuate section with a twelve (12) foot radius, having a final divert angle of 20°, operating at 650 feet per minute results in an average lateral acceleration of about 0.32 g, with a maximum lateral acceleration of about 0.347 g; an arcuate section with an 8 foot radius, having a final divert angle of 30°, operating at 650 feet per minute results in an average lateral acceleration of about 0.51 g, with a maximum lateral acceleration of about 0.62 g; an arcuate section with a 15 foot radius, having a final divert angle of 20°, operating at 630 feet per minute results in an average lateral acceleration of about 0.24 g, with a maximum lateral acceleration of about 0.26 g; an arcuate section with a 12 foot radius, having a final divert angle of 20°, operating at 630 feet per minute results in an average lateral acceleration of about 0.3 g, with a maximum lateral acceleration of about 0.33 g; and an arcuate section with a 8 foot radius, having a final divert angle of 30°, operating at 630 feet per minute results in an average lateral acceleration of about 0.48 g, with a maximum lateral acceleration of about 0.58 g.

The curved divert guide path allows for better controlled carton handling. While a large radius for arcuate portion 142 is desirable, to take the pushers to their maximum lateral speed as gradually as possible, improvements from use of the present innovation may be seen at a radius as small as one foot providing improved control at lower speeds. The divert guide path defined by section 146, having a low divert angle, and arcuate portion 142, distributes the force necessary to laterally accelerate articles over a longitudinal and lateral distance, instead of a large initial, almost instantaneous force being applied to the article being diverted as the result of the pusher elements moving transversely at the final divert angle or a large divert angle when the article is initially contacted. The energy to laterally accelerate the cartons is initially imparted to the cartons at a low lateral speed, and is imparted thereafter at increasing lateral speeds until the lateral speed of the cartons match the final divert lateral speed.

Within zone E, as the diverted set of pushers travels through the arcuate portion 142 of divert guide path 140, the lateral speed of the diverted article 134 is increased, being laterally accelerated as the pushers 132 in contact with the article 134 are accelerated from a first speed at which the carton was initially contacted to a second speed at the end of zone E, at which the divert angle of the end 14b of divert guide path 140 preferably is approximately tangent to the divert angle of straight section 150, which is the final divert angle at which the diverted carton is delivered to the divert. Within zone E, pushers which may be bridged therein, and thus not in contact with the carton, are also accelerated to the second speed at the end of zone E. Generally, all pushers 132 of the diverted set within zone F will be in contact with the carton. Throughout the length of the arcuate divert guide path defined by arcuate portion 142, for a single radius arc, the lateral acceleration of pushers travelling there along gradually increases until it instantaneously goes to zero when straight section 150 is entered at entrance 16a.

Figure 4:
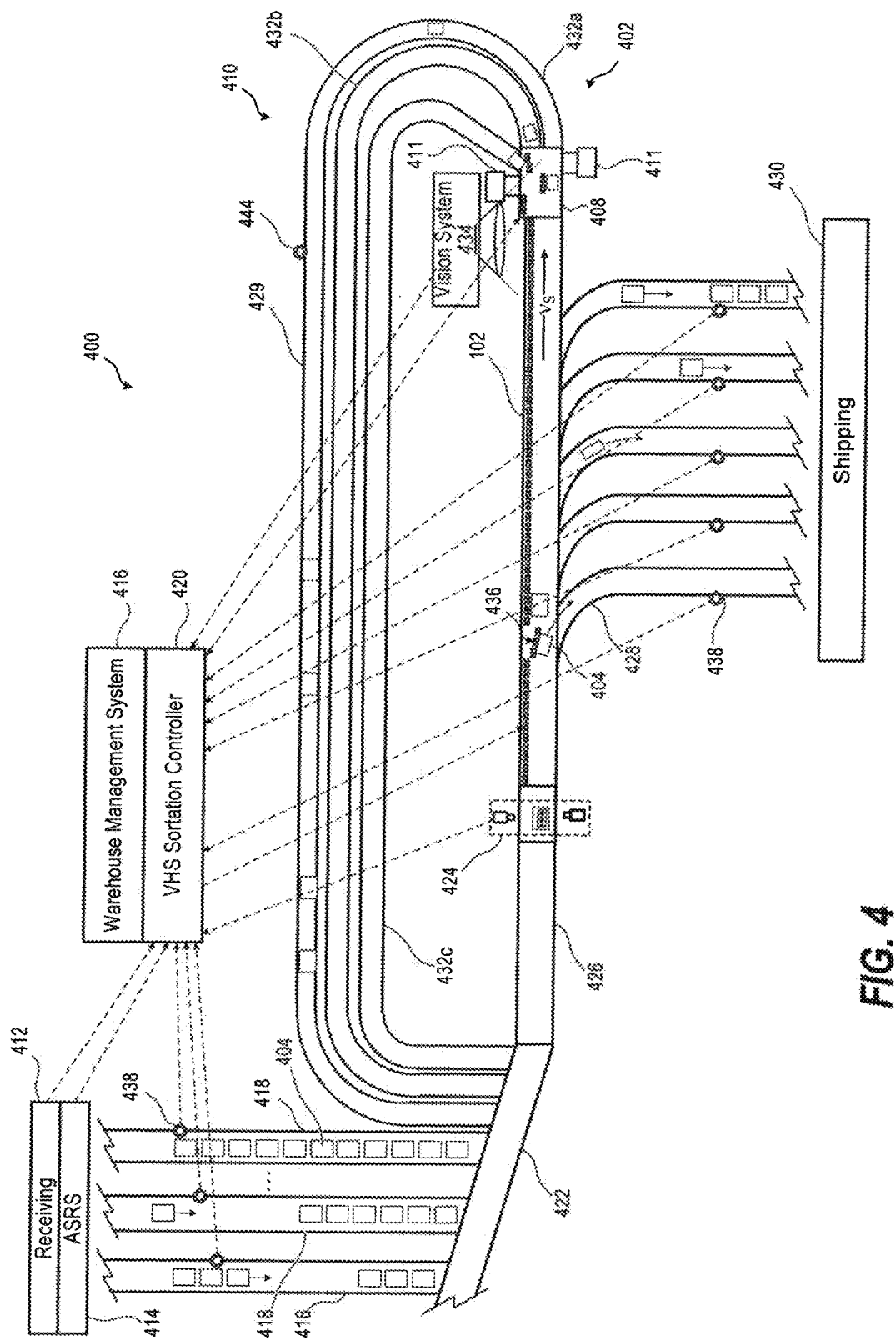
FIG. 4 illustrates a diagrammatic top view of an example material handling system that includes a recirculation sortation conveyor for dynamic recirculation capacity that accommodates very high speed operation, according to one or more embodiments.

FIG. 4 illustrates a material handling system 400 having a dynamic capacity recirculation system 402 that can accommodate high volumes of articles 404 that are not diverted by the VHS linear sortation conveyor 102. The dynamic capacity recirculation system 402 is managed by a recirculation sortation conveyor 408 that can switch articles such as cartons or totes to more than one recirculation destination, illustrated as three recirculation sortation conveyors 410 and two destination locations 411 such as chutes or Gaylords. The recirculation sortation conveyor 408 can incorporates aspects of pre-sorting and diverting with a "soft touch" as described for the linear sortation conveyor 106 (FIG. 1) to facilitate VHS operation.

The material handling system 400 receives articles in a receiving center 412 and may buffer inventory in a storage area, such as an automated storage/retrieval system (ASRS) 414. In response to orders or re-optimizing placement within a distribution center, a warehouse management system (WMS) 416 can direct that articles 404 be brought out of ASRS 414. In other instances, WMS 416 can determine what articles 404 have been received in the receiving center 412 and convey the articles 404 for sorting. Articles are accumulated on accumulation conveyors 418. A sortation controller 420 monitors the articles 404 on the accumulation conveyor and can receive information from WMS 416 as to destination and priority of these articles 404. Sortation controller 420 executes a zipper merge or slug merge operation to release articles 404 onto a merge conveyor 422. In order meet requirements of a scanner 424 and the linear sortation conveyor 102 for spacing between articles 404, the articles are gapped on a gapping conveyor 426 before pass through the field of view of the scanner 424. Linear sortation conveyor 102 diverts each article 404 to an assigned destination, such as a selected divert conveyor 428 to a shipping center 430. Those articles 404 that are not delivered are then handled by the recirculation sortation conveyor 410. In an illustrative embodiment, the recirculation sortation conveyor 410 presorts right or left respectively to align articles for a first and second recirculation sortation conveyor 432a-432b. To handle a large amount of recirculation such as due to an emergency stop of the linear sortation conveyor 102, the recirculation sortation conveyor 410 can also divert certain cartons to a third recirculation sortation conveyor 432c. For clarity, each recirculation sortation conveyor 432a-432c has its own path back to become an accumulation input to the merge conveyor 422. In some embodiments, the recirculation sortation conveyor 432a-432c can themselves merge beforehand and can terminate at another accumulation conveyor 418.

Sortation conveyor 420 can obtain positioning information for articles 404 to be recirculated from a vision system 434. Certain articles 404 may have been laterally, longitudinally, or rotationally displaced during transit of the linear sortation conveyor 410. Recirculation sortation conveyor 410 can adjust assignment of pushers 436 to compensate for this displacement. In addition, photoeyes 438 can be placed a key places on the material handling system 400 to economically obtain information as to the position of articles 404. Articles 404 can be relatively small, such as e-commerce parcels or polybags. Recirculation sortation conveyor 410 can divert certain articles to chutes 440 rather than recirculating the articles 404 for resorting.

Figure 5:
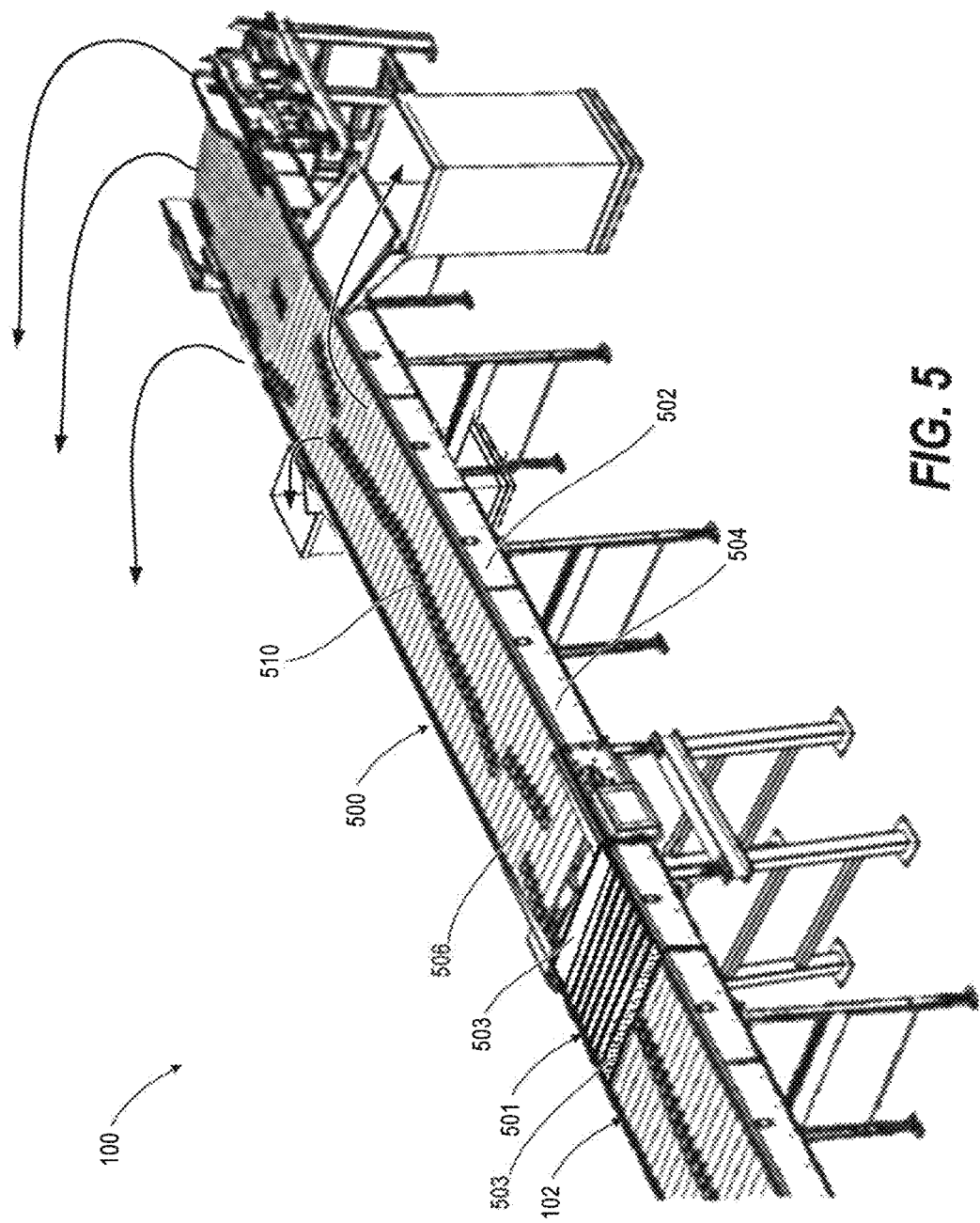
FIG. 5 illustrates an isometric view of a downstream end of the linear sortation conveyor of FIG. 2 and an example recirculation sortation conveyor of FIG. 4, according to one or more embodiments.

FIG. 5 illustrates the linear sortation conveyor 102 inducting onto a transition conveyor section 501 and then onto an example recirculation sortation conveyor 500. The transition conveyor section 501 can be a roller conveyor or belt conveyor section with gap fillers 503 such as upwardly extending brush bristles or horizontal sliding plates. The transition conveyor section 501 covers any drive pulley curvature of the linear sortation conveyor 102. The recirculation sortation conveyor 500 includes an elongate frame 502 having a pair of lateral side frames 504. An endless apron 506 of slats 508 is supported for longitudinal movement on the elongate frame 502 to define a top conveying run and a bottom return run. The endless apron 506 of the recirculation sortation conveyor 500 is positioned downstream of a linear sortation conveyor 102 to receive the undiverted articles 404 (FIG. 4) at an offset lateral position. More than one pusher 510 is received for lateral movement across the endless apron 506 transverse to the longitudinal movement. Each pusher 510 has a pin (not shown) extending below the top conveying run.

FIG. 6 illustrates the recirculation sortation conveyor 500 having a pin guide assembly 601 that is coupled between the elongate lateral frames 502 and upwardly presented to receive a pin 603 and thereby to guide each pusher 510. The pin guide assembly 601 includes an upstream pre-sort section 605 that positions the articles 404 selectively from an offset lateral portion 607 to an opposite lateral portion 609 of the top conveying run of the endless apron 506 (FIG. 5), which are illustrated as left and right respectively. Recirculation sortation conveyors 520a-520b are positioned downstream of the recirculation sortation conveyor 500 respectively to receive articles 404 presorted to one of the offset lateral position 607 and the opposite lateral position 609. Those articles 404 that are to be diverted are switched by a divert section 611 rather than continuing straight ahead onto recirculation sortation conveyors 520a-520b.

As the pushers 510 travel on the bottom return run of the endless apron 506 (FIG. 5), each pusher 510 is centered by left and right converging guides 613, 615. As assigned, each pusher 510 is selectively reset by setup switch 616 to continue on bottom straight guide 617 or to follow a bottom offset guide 619 to position the pusher 510 outside of the offset lateral portion 607. Once the pusher 510 is returned to the starting point of the top conveying run of the endless apron 506 (FIG. 5), a calibration gate 621 can be activated to align the pusher 510 further outboard of the pin guide assembly 601 to traverse outside of a left side straight guide 623 for calibration purposes. Pushers 510 that are otherwise selected to be on this outboard side rather than the middle by the setup switch 616 are used to laterally reposition articles 404. Each outboard pusher 510 is selected that is predicted to flank a particular article 404 that is to be laterally and gently repositioned to the opposite lateral portion 609. The flanking pusher 510 is guided toward the center to a center passage 625 by a left converging guide 627. Pushers 510 that were generally centered by the setup switch 616 are selected to slightly move toward the offset lateral portion 607 by an angled guide 629 that brings these pushers 510 into the center passage 625 while aligning as necessary any article 404 in the offset lateral portion 607 that was assigned to remain in the offset lateral portion 607. The pushers 510 can then follow a straight guide 631 that moves slightly toward the opposite lateral portion 609, gently finishing lateral positioning of any articles that were assigned to opposite lateral portion 609. The pushers 510 then enter a left shifting center passage 633 that position the pushers 510 in the center of the endless apron 506 (FIG. 5), separated by a small amount from articles 404 that may be to either side. Right-to-center guide 634 also directs any pushers 510 that may have been inadvertently on the opposite lateral portion 609. Pins 603 of the pushers 510 then enter a first nested dual switch 635 having a first left switch 637 that can selectively direct a pusher 510 onto a leftward diverging guide 639 or a second right switch 641 that selectively direct a pusher 510 onto a rightward diverging guide 643. Any flanked article 404 is thereby diverted. A return guide 645 directs any diverted pusher to follow respectively a left or right straight path 647, 649 through the remainder of the divert section 611.

FIG. 6 illustrates a second nested dual switch 635 in which only the first left switch 637 is used to obtain another left divert destination "D2" via a second leftward diverging guide 639. the second right switch 639 is not used. A third nested dual switch 635 is not used. It should be appreciated that any number of divert paths can be incorporated to achieve a desired number of recirculation paths, including no divert paths. In one or more embodiments, the recirculation sortation conveyor 500 can also be used to direct articles 404 to other locations that back to the linear sortation conveyor 102 (FIG. 3).

In operation, FIG. 7 illustrates the recirculation sortation conveyor 500 assigning pushers 510 to pre-sort and selectively divert articles ("A") 404 from an offset induct ("I") to one of five locations. By pre-sorting left, certain articles 404 are prepared to routing to left side divert destinations "D1" and "D2" or left side recirculation destination "D3". By pre-sorting right, certain articles 404 are prepared for right side recirculation destination "D4" or for right side divert destination "D5". Pushers 510 can be directed to an outboard and straight calibration path 701. Pushers 610 otherwise selected to be on the offset lateral portion 607 follow a left-to-center path 703, moving any article 404 most to the way into the opposite lateral portion 609. Pushers 510 that were left centered follow a slightly angled path 705 closer to the center thereby adjusting any articles to the left that were assigned to remain in the offset lateral portion 607. A left and right adjusting path 707 that follows gently completes any required outward movement of the articles 404 in preparation for diverting or allowing to exit off the end of the recirculation sortation conveyor 500 on the assigned lateral side. Each pusher 510 can then be allowed to transit along an undiverted, straight path 709, can be switched onto a first left divert path 711, switched right onto a right divert path 713, or switch onto a second left divert path 715.

Figure 8:
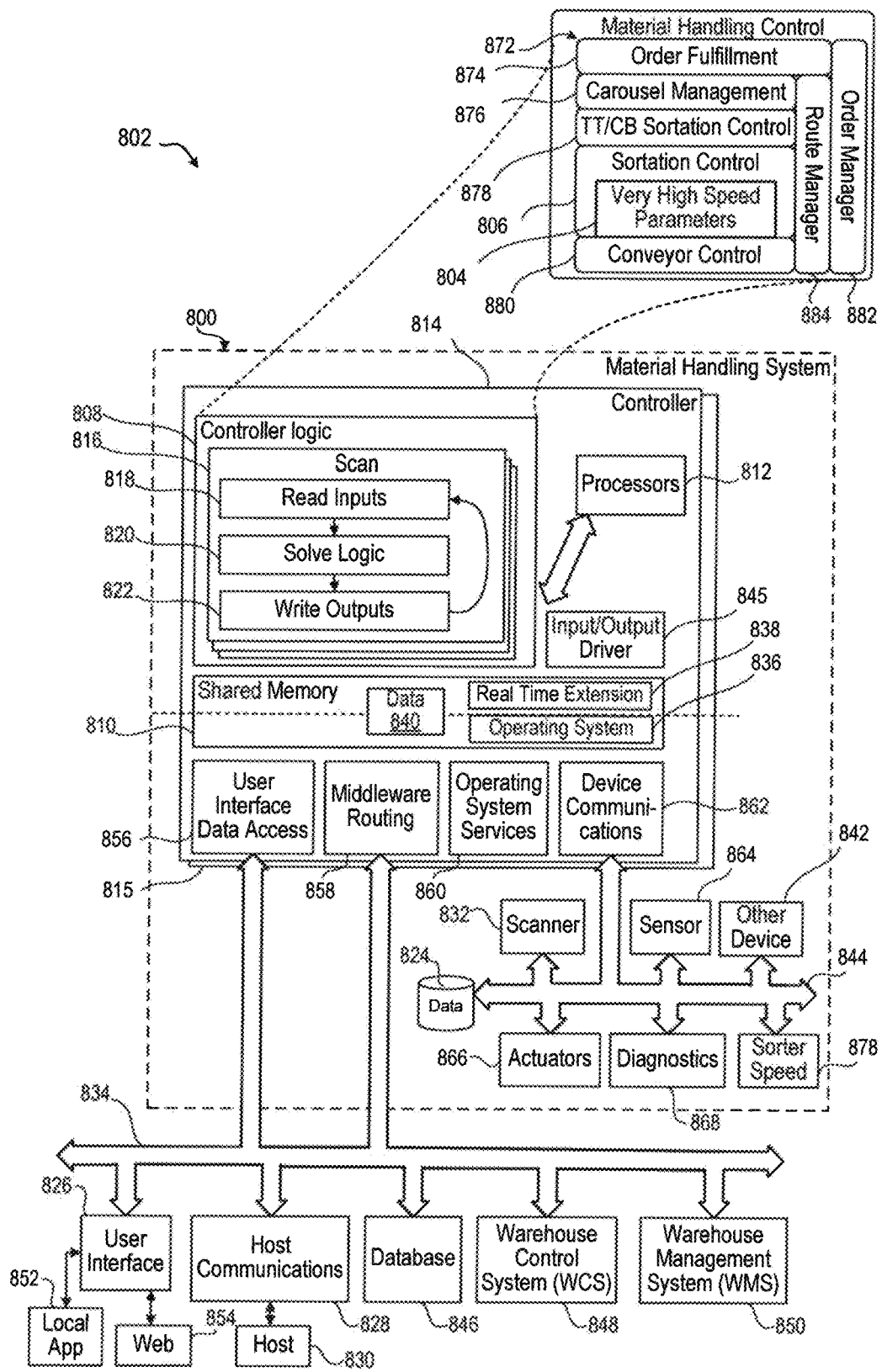
FIG. 8 illustrates an exemplary processing architecture of the example material handling system of FIG. 3, according to one or more embodiments.

In FIG. 8, an exemplary material handling system 800 of a distribution center processing architecture 802 is depicted wherein very high speed sortation controller 804 is implemented within a sortation control 806. Controller logic 808 stored in computer-readable, shared memory 810 is executed by processors 812 in a controller 814 of the material handling system 800. One function of the controller logic 808 can be machine control logic. The controller 814 can be a primary controller supported by a backup controller 815 such that maintenance personal could swap cables or connections in the event of a failure without undue service downtime. Alternatively, a supervising system or the self-diagnostics could cause automatic switching between primary and backup in the event of a failure.

Scan logic, or merely a scan 816, refers to an implementation within the controller logic 808 wherein the processors 812 repeatedly execute a read input component 818, a solve logic component 820, and a write outputs component 822. By performing this sequence on a regular, periodic basis (deterministic), then the machine control logic can count scans to measure time. These three steps can be performed by a programmable logic controller (PLC), a personal computer (PC), a minicontroller, or microcontroller, etc. The solve logic component 820 can incorporate IF-THEN-ELSE branching logic, motion control, simple to sophisticates, hardlined to configured. Data, used by the solve logic component 820, can reside in the computer-readable, shared memory 810 or a data store device 824 (e.g., local, remote, cloud-based, etc.). A user interface 826 can be used to modify the solve logic component 820 such as by changing values that change the configuration or operation.

As is conventionally understood, the controller logic 808 can receive binary type inputs (e.g., switches, photo eyes, etc.) and generate binary type outputs (e.g., motor contacts, solenoid valves, lamp actuations, etc.). For example, in such an implementation, the user interface 826 can entail at least in part push button controls and lamps. More recent developments for controller logic 808 can include RS232 serial devices with cathode ray tube (CRT) screens and keyboards that enable dialog screens and data display along with printers for generating reports. Barcode scanning can detect items processed by the material handling system 800. More recently, wired and wireless communication within the material handling system 800 and distribution center processing architecture 802 enable more distributed and remotely isolated implementations. For example, such communication architectures may employ bus couplers such a PROFIBUS and ETHERCAT.

The scan 816 can be one of many control scans to support increased speeds and complexities for portions of the material handling system 800. Certain logic is required to be performed during shorter intervals than others and so the scans 816 can have different periodicities, often selected for convenience to occur as multiples of the shortest duration scan 816. Examples include scans 816 of 1 ms and 2 ms for motion control, 8 ms for a merge subsystem, and 211 ms for general conveyor.

The material handling system 800 can incorporate host communications 828 to a warehouse execution system 830 using serial ports, Ethernet, file transfer protocol (FTP), Transfer Control Protocol/Internet Protocol (TCP/IP), etc. Thereby, the warehouse execution system 830 can make decisions for the material handling system 800. For example, a scanner 832 can see a barcode. The barcode is sent to the warehouse execution system 830, such as via a bridge 834. The warehouse execution system 830 responds with a destination. In response, the material handling system 800 causes the item with the barcode to go to that destination. Alternatively, the process can entail receiving a batch or download of destinations mapped to barcodes as part of a lookup table (LUT) for reference by the material handling system 800. Warehouse execution system can refer to an order fulfillment system, a warehouse management system, a warehouse control system, a host system, etc.

The computer-readable shared memory 810 can allow execution of an operating system (e.g., Windows, LINX, etc.) 836 to execute with a real time extension 838. The real time extension 838 assures that the machine control logic (controller logic 808) gets to execute completely on the time schedule required. Variations in the execution schedule are measured in microseconds. This approach assures the kind of precision required for the machine control while retaining access to the power and flexibility of a general purpose Operating system (e.g., Windows). PLCs, which can also be included for machine control, can operate in their own proprietary environments (hardware and software) and are integrated using communications. Data 840 from these communications is stored in computer-readable shared memory 810 for use in control decisions and for display on user interface 826. In an exemplary version, the data 840 is not controlled by the real time extension 838. In a similar fashion, other communicating devices 842 used in the control process (e.g., scales, printers) are connected via a private internal communications bus (e.g., Ethernet) 844 to the processors 812. The controller 814 can also have internal input/output drivers 845 to interface using specific communication protocols.

The distribution center processing architecture 802 can include other systems external to the material handling system 800 that communicate via the bridge 834, such as a database 846, a warehouse control system (WCS) 848, and a warehouse management system (WMS) 850. In addition, the user interface 826 can facilitate remote or automated interaction via the user interface 826, depicted as a local application 852 and a web application 854. The controller 814 can include specific interfaces to support this interaction, such as a user interface data access component 856 to interact with user interface 826, middleware routing component 858 to interface with other external systems. Operating system services 860 and a device communication component 862 can also support the communications, such as sensors 864, actuators 866, diagnostic systems 868, and a sorter speed control 870.

The controller logic 808 can be functional described as material handling control layers 872 of software functionality, such as the sortation control 806, that address certain subsystems within a distribution center: order fulfillment 874, carousel management 876, tilt tray/cross belt (TT/CB) control 878, conveyor control 880, order manager 882 and route manager 884.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

For example, running average carton length can be used. Then, after a reset, the expected average for the ten minute timer can be used. The same approach can be used for the one (1) minute average for recirculation. Alternatively or in addition, inter-slug gap can be considered in the calculation.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

Figure 9:
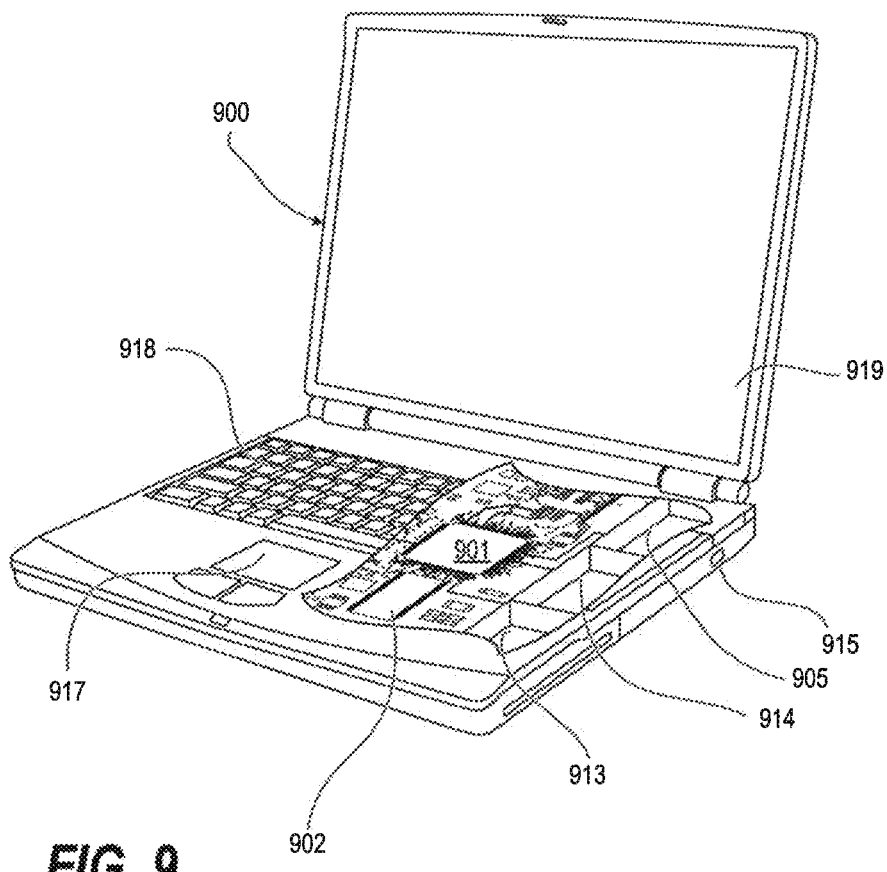
FIG. 9 illustrates a depiction of an isometric view of a laptop computer for executing instructions to perform dynamic recirculation for very high speed sortation, according to one or more embodiments.

The various embodiments may be implemented in any of a variety of computing devices, an example of which is illustrated in FIG. 9. A computing device 900 will typically include a processor 901 coupled to volatile memory 902 and a large capacity nonvolatile memory, such as a disk drive 905 of Flash memory. The computing device 900 may also include a floppy disc drive 913 and a compact disc (CD) drive 914 coupled to the processor 901. The computing device 900 may also include a number of connector ports 915 coupled to the processor 901 for establishing data connections or receiving external memory devices, such as a USB or FireWire™ connector sockets, or other network connection circuits for establishing network interface connections from the processor 901 to a network or bus, such as a local area network coupled to other computers and servers, the Internet, the public switched telephone network, and/or a cellular data network. The computing device 900 may also include the trackball or touch pad 917, keyboard 918, and display 919 all coupled to the processor 901.

Figure 10:
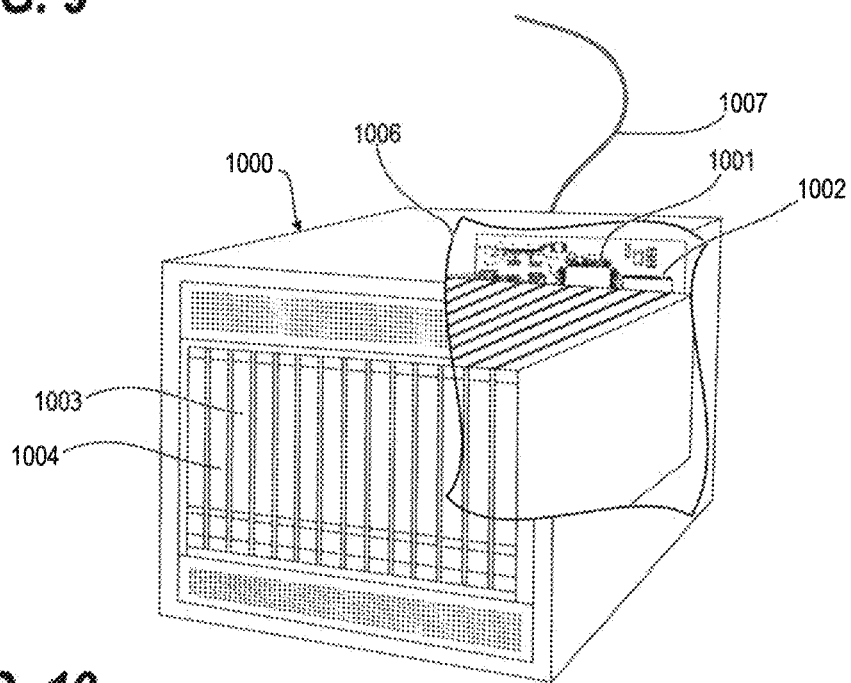
FIG. 10 illustrates a depiction of an isometric view of a server information handling system for executing instructions to perform dynamic recirculation for very high speed sortation, according to one or more embodiments.

The various embodiments may also be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 coupled to the processor 1001 for establishing network interface connections with a network 1007, such as a local area network coupled to other computers and servers, the Internet, the public switched telephone network, and/or a cellular data network.

Figure 11:
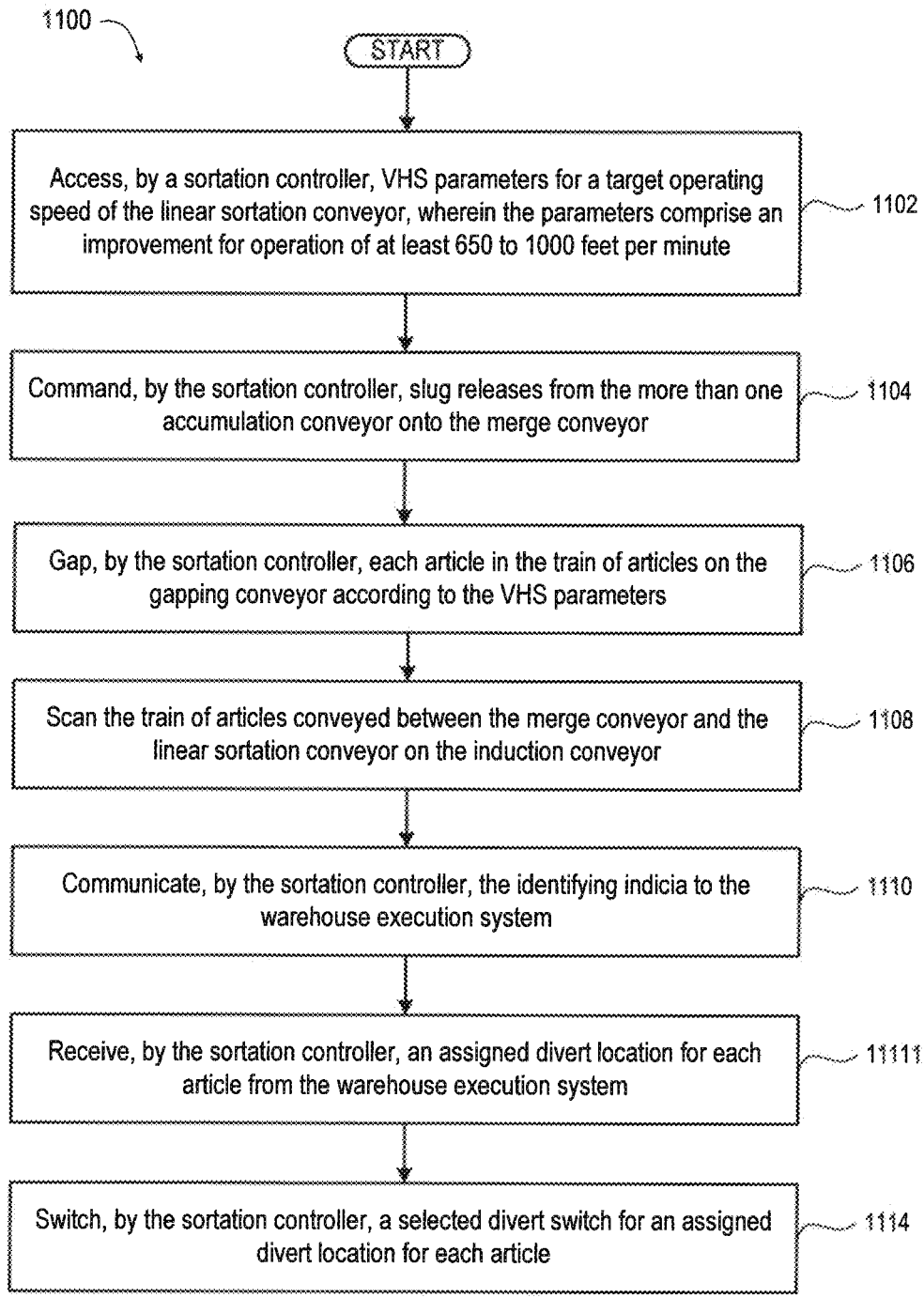
FIG. 11 illustrates a flow diagram of a method of controlling a material handling system according to improved parameters for VHS operation, according to one or more embodiments.

FIG. 11 illustrates a method 1100 of VHS sortation by a material handling system. In one or more embodiments, method 1100 includes accessing, by a sortation controller, parameters for a target operating speed of the linear sortation conveyor, wherein the VHS parameters comprise an improvement for operation of at least 650 to 1000 feet per second (block 1102). In an exemplary, demonstrated improvement, the VHS parameters provide for 650 to 700 feet per second. For example, for totes that are approximately 18" square, the VHS parameters yield a sustained, demonstrated effective rate of 400 totes per minute (TPM). Method 1100 includes commanding, by the sortation controller, slug releases from the more than one accumulation conveyor onto the merge conveyor (block 1104). Method 1100 includes gapping, by the sortation controller, each article in the train of articles on the gapping conveyor according to the VHS parameters (block 1106). Method 1100 includes scanning the train of articles conveyed between the merge conveyor and the linear sortation conveyor on the induction conveyor (block 1108). Method 1100 includes communicating, by the sortation controller, the identifying indicia to the warehouse execution system (block 1110). Method 1100 includes receiving, by the sortation controller, an assigned divert location for each article from the warehouse execution system (block 1112). Method 1100 includes switching, by the sortation controller, a selected divert switch for an assigned divert location for each article (block 1114).

Figure 12:
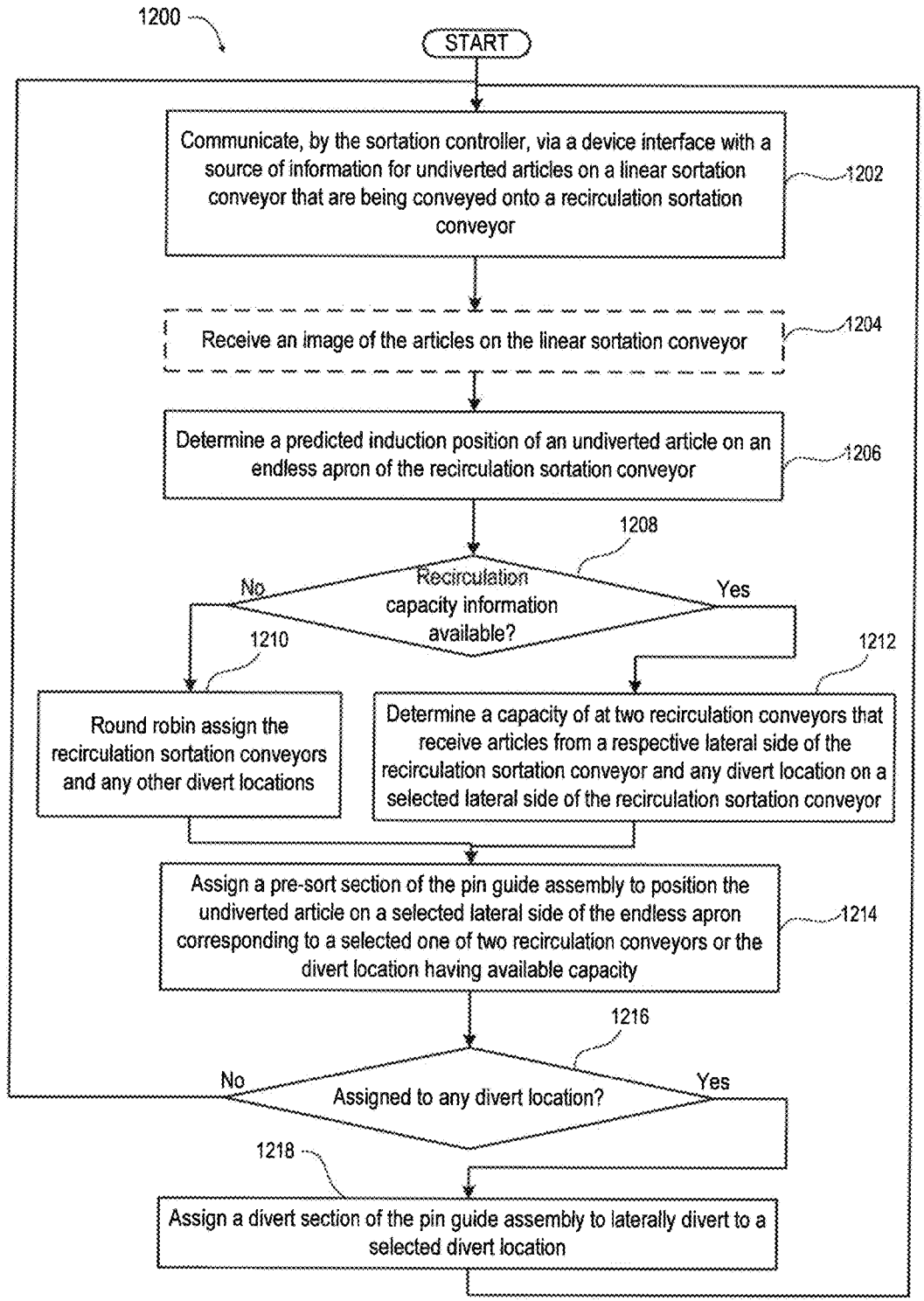
FIG. 12 illustrates a flow diagram of a method of performing dynamic recirculation for very high speed sortation, according to one or more embodiments.

FIG. 12 illustrates a method 1200 of a sortation controller of a material handling system dynamically recirculating articles. In one or more embodiments, the method 1200 includes communicating, by the sortation controller, via a device interface with a source of information for undiverted articles on a linear sortation conveyor that are being conveyed onto a recirculation sortation conveyor (block 1202). In one or more embodiments, the method 1200 includes receiving an image of the articles on the linear sortation conveyor (block 1204). The method includes determining a predicted induction position of an undiverted article on an endless apron of the recirculation sortation conveyor (block 1206). The method 1200 includes determining whether capacity information is available for recirculation conveyors and any other divert location of the recirculation sortation conveyor (decision block 1208). In response to determining that capacity information is not available in decision block 1208, the method 1200 includes round robin assigning the recirculation sortation conveyors and any other divert locations (block 1210). In response to determining that capacity information is available in decision block 1208, the method 1200 includes determining a capacity of at two recirculation conveyors that receive articles from a respective lateral side of the recirculation sortation conveyor and any divert location on a selected lateral side of the recirculation sortation conveyor (block 1212). After completing either block 1210 or block 1212, method 1200 includes assigning a pre-sort section of the pin guide assembly to position the undiverted article on a selected lateral side of the endless apron corresponding to a selected one of two recirculation conveyors or the divert location having available capacity (block 1214). Method 1200 further determines whether the assignment is to any divert location (decision block 1216). In response to determining that the assignment is to not to any divert location in decision block 1216, the method 1200 returns to block 1202. In response to determining that the assignment is to any divert location in decision block 1216, the method 1200 includes assigning a divert section of the pin guide assembly to laterally divert to a selected divert location (block 1218). Then method 1200 returns to block 1202.

Figure 13:
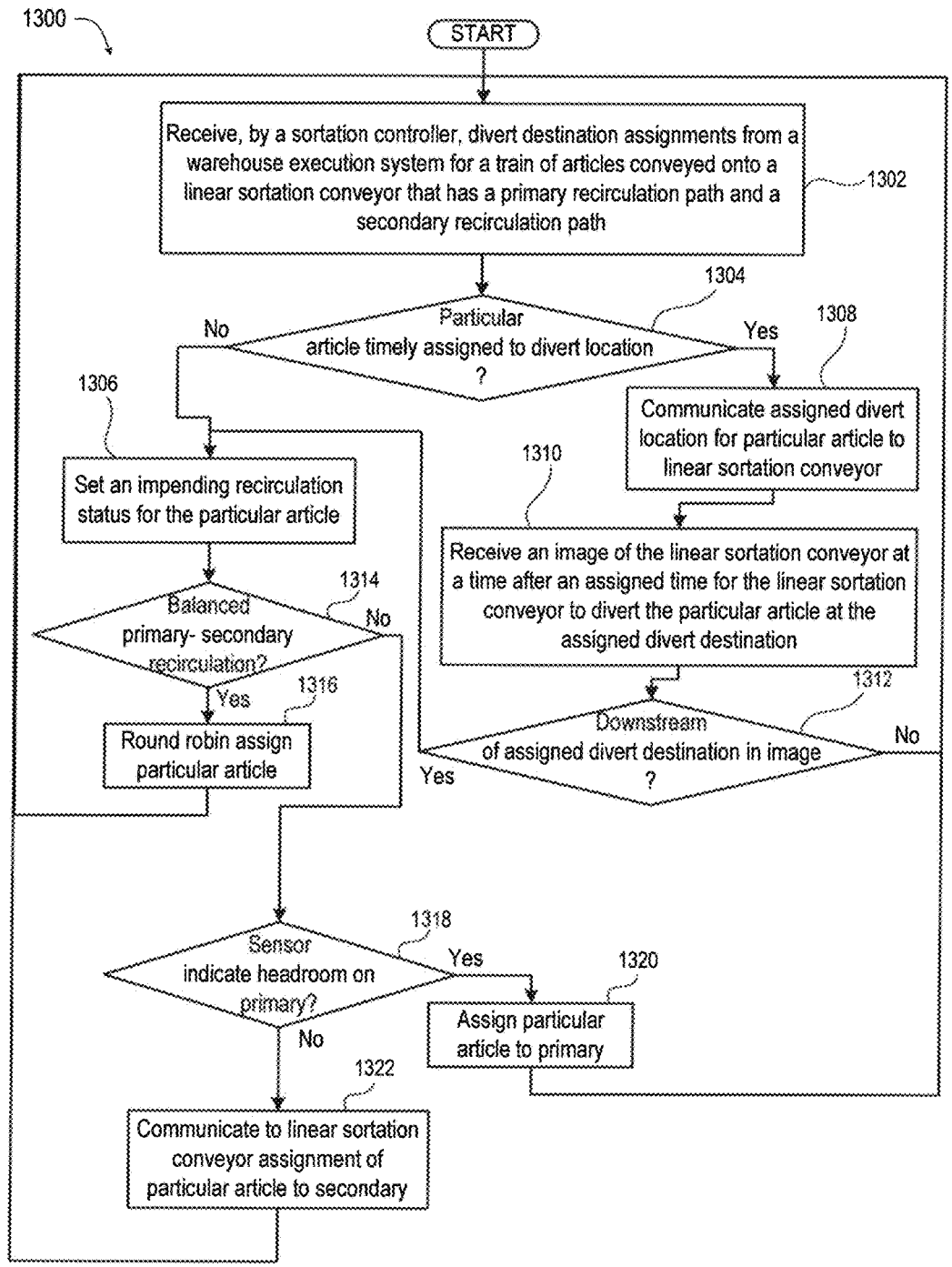
FIG. 13 illustrates a flow diagram of a method of dynamic recirculation control for a linear sortation conveyor of a material handling system, according to one or more embodiments.

FIG. 13 illustrates a method 1300 of dynamic recirculation control for a linear sortation conveyor of a material handling system. In one or more embodiments, the method 1300 receiving, by a sortation controller, divert destination assignments from a warehouse execution system for a train of articles conveyed onto a linear sortation conveyor that has a primary recirculation path and a secondary recirculation path (block 1302). At least one of the primary and secondary recirculation paths are reachable by a particular article by lateral repositioning on an endless apron of the linear sortation conveyor. The method 1300 includes determining whether the warehouse execution system fails to timely assign the particular article to any divert destination (decision block 1304). In response to determining that the warehouse execution system has failed to timely assign the particular article to any divert location in decision block 1304, then method 1300 includes setting an impending recirculation status for the particular article (block 1306). In response to determining that the warehouse execution system has timely assigned the particular article to any divert location, the method 1300 includes communicating the assigned divert destination for the particular article to the linear sortation conveyor (block 1308). The method 1300 includes receiving an image of the linear sortation conveyor at a time after an assigned time for the linear sortation conveyor to divert the particular article at the assigned divert destination (block 1310). The method 1300 includes recognizing whether the particular article is in the image at a position on the linear sortation conveyor downstream of the assigned destination location (decision block 1312). In response to recognizing the particular article in the image at the position on the linear sortation conveyor downstream of the assigned destination location in decision block 1312, the method 1300 includes setting an impending recirculation status for the particular article (block 1306). In response to recognizing the particular article is not in the image at the position on the linear sortation conveyor downstream of the assigned destination location in decision block 1312, the method 1300 includes returning to block 1302 to continue assigning and monitor articles of the train of articles.

Returning to block 1306, the method 1300 includes determining whether the material handling system is configured for balanced recirculation on the primary and secondary recirculation paths (decision block 1314). In response to determining that the material handling system is configured for balanced recirculation on the primary and secondary recirculation paths in decision block 1314, the method 1300 includes round robin assigning of the particular article along with any other articles in the train of articles having the status of impending recirculation (block 1316). Then method 1300 returns to block 1302 to continue assigning and monitor articles of the train of articles. In response to determining that the material handling system is not configured for balanced recirculation on the primary and secondary recirculation paths in decision block 1314, the method 1300 includes determining whether a sensor indicates that the primary recirculation path has headroom to receive the particular article (decision block 1318). In response to determining that the sensor indicates that the primary recirculation path has headroom to receive the particular article in decision block 1318, the method 1300 includes assigning the particular article to the primary recirculation path, which can entail merely allowing the particular article to exit off of the end of the linear sortation conveyor (block 1320). Then method 1300 returns to block 1302 to continue assigning and monitor articles of the train of articles. In response to determining that the sensor indicates that the primary recirculation path does not have headroom to receive the particular article in decision block 1318, the method 1300 includes communicating to the linear sortation conveyor an assignment of the particular article to the secondary recirculation path to prompt diverting at the last divert location (block 1322). Then method 1300 returns to block 1302 to continue assigning and monitor articles of the train of articles.

While the present embodiment of the invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A material handling system comprising:
    a linear sortation conveyor comprising:
        an elongate frame comprising a pair of lateral side frames;
        an endless apron supported for movement on the elongate frame to define a top conveying run and a bottom return run;
        more than one pusher received for lateral movement across the endless apron;
        more than one divert conveyor positioned respectively along at least one lateral side of the elongate frame to receive articles diverted by one or more pushers from the top conveying run of the endless apron;
        a plurality of switches that selectively divert articles to one of a plurality of divert locations, wherein respective divert locations are associated with a selected divert conveyor;
        more than one divert guide path, each respective divert guide path of the more than one divert guide path disposed downstream of a respective associated more than one switch to receive a selected pusher diverted by a selected switch into the selected divert guide path to divert a selected article, wherein each respective divert guide path comprises an arcuate portion having a continuously increasing slope without a breakpoint to laterally accelerate the diverted article without an abrupt initial force being applied;
        a primary recirculation path that receives undiverted articles from a downstream end of the linear sortation conveyor; and
        a secondary recirculation path that communicates with a last divert location of the linear sortation conveyor;
    a sortation controller in communication with the linear sortation conveyor configured to execute computer-readable instructions on a processor to configure the material handling system to:
        determine whether any article conveyed on the linear sortation conveyor is not assignable to a divert location;
        in response to determining that a particular article is not assignable to a divert location, assign the particular article to a selected one of the primary recirculation path and the secondary recirculation path.

2. The material handling system of claim 1, further comprising a sensor that detects headroom on the primary recirculation path to receive another article, wherein: the sortation controller is in communication with the sensor, wherein the sortation controller:
    determines whether the sensor indicates headroom on the primary recirculation path to receive the particular article; and
    in response to determining that the primary recirculation path does not have headroom, assigns the particular article to the secondary recirculation path.

3. The material handling system of claim 1, wherein the sortation controller performs round robin assignment of the particular article to the selected one of the primary and secondary recirculation paths.

4. A recirculation sortation conveyor that dynamically recirculates articles that are not diverted by a linear sortation conveyor of a material handling system, the recirculation sortation conveyor comprising:
  an elongate frame comprising a pair of lateral side frames;
  an endless apron supported for longitudinal movement on the elongate frame to define a top conveying run and a bottom return run and positioned downstream of the linear sortation conveyor to receive at an offset lateral position a train of articles that are not diverted by the linear sortation conveyor;
  more than one pusher received for lateral movement across the endless apron transverse to the longitudinal movement, each pusher having a pin extending below the top conveying run;
  a pin guide assembly coupled between the pair of lateral side frames, upwardly presented to selectively receive the pin of respective more than one pusher, and comprising:
    an upstream pre-sort section that positions the articles selectively from the offset lateral position to an opposite lateral position of the top conveying run; and
    a divert section comprising:
      a plurality of divert guide paths, each divert guide path comprising an arcuate portion having an entrance at a first angle that smoothly increases to a larger second angle to the longitudinal movement, the arcuate portion laterally accelerating the selected, flanked articles without any abrupt impacts, wherein the upstream pre-sort section positions the flanked article laterally proximate to the selected pusher; and
  two or more recirculation sortation conveyors positioned downstream of the recirculation sortation conveyor respectively to receive articles presorted to one of the offset lateral position and the opposite lateral position.

5. The recirculation sortation conveyor of claim 4, wherein the pre-sort section laterally repositions selected articles with a gently increasing acceleration to mitigate article sliding and misalignment on the top conveying run proximate to the pushers for very high speed operation.

6. The recirculation sortation conveyor of claim 5, wherein the pre-sort section of the pin guide assembly comprises:
  a reset mechanism to selectively position each pusher in one of an outer position and a central position that each flank the offset lateral position of the top conveying run that receives inducted articles; and
  a side shifting guide that receives a pusher in the outer position and guides the pusher and a flanked article to the opposite lateral position of the top conveying run.

7. The recirculation sortation conveyor of claim 6, wherein the side shifting guide comprises a sinusoidal curved path that smoothly accelerates and then decelerates the flanked article for accurately depositing without jostling of the flanked article on the opposite lateral position.

8. The recirculation sortation conveyor of claim 4, further comprising: one or more divert targets positioned respectively along a selected lateral side of the elongate frame to receive articles diverted by one or more pushers from the top conveying run of the endless apron and to convey the received article onto a selected one of a gaylord container, a chute, and one of the two or more recirculation sortation conveyors; and
  the pin guide assembly comprising a downstream divert section that selectively diverts the articles to the assigned divert target.

9. The recirculation sortation conveyor of claim 8, wherein the downstream divert section laterally diverts selected articles with a gently increasing lateral acceleration on the top conveying run for very high speed operation without tumbling the selected article.

10. The recirculation sortation conveyor of claim 9, wherein the divert section of the pin guide assembly comprises:
  a plurality of switches to selectively engage a pin of a selected pusher on the top conveying run;
  wherein each respective divert guide path of the plurality of divert guide paths is disposed downstream of a respective associated one of the plurality of switches to engage the pin switched by the associated switch.

11. A recirculation sortation conveyor comprising:
  an elongate frame comprising a pair of lateral side frames;
  an endless apron supported for longitudinal movement on the elongate frame to define a top conveying run and a bottom return run and positioned downstream of a linear sortation conveyor to receive at an offset lateral position a train of articles that are not diverted by the linear sortation conveyor;
  more than one pusher received for lateral movement across the endless apron transverse to the longitudinal movement, each pusher having a pin extending below the top conveying run;
  a pin guide assembly coupled between the elongate lateral frames, upwardly presented to selectively receive the pin of respective more than one pusher, and comprising:
    an upstream pre-sort section that positions the articles selectively from the offset lateral position to an opposite lateral position of the top conveying run; and
    two or more recirculation sortation conveyors positioned downstream of the recirculation sortation conveyor respectively to receive articles presorted to one of the offset lateral position and the opposite lateral position; and
  a sortation controller comprising:
    a device interface in electrical communication with one of a sortation controller of the linear sortation conveyor and an imaging device to receive position information of the train of articles inducted onto the endless apron; and
    a processor subsystem in communication with the pin guide assembly and the device interface, wherein the processor subsystem configures the recirculation sortation conveyor to:
      determine whether a first one of the two or more recirculation sortation conveyors has a sufficient headroom gap to receive an article; and
      in response to determining that the first one of the two or more recirculation sortation conveyors does not have a sufficient headroom gap to receive an article, configure the pin guide assembly to divert a selected article to another one of two more recirculation targets.

12. The recirculation sortation conveyor of claim 11, wherein the processor subsystem configures the recirculation sortation conveyor to:
  determine that the linear sortation conveyor has initiated a stop; and in response to determining that the linear sortation conveyor has initiated a stop, determining that a default recirculation sortation conveyor has insufficient headroom gap.

13. The recirculation sortation conveyor of claim 11, wherein the processor subsystem configures the recirculation sortation conveyor to configure the pin guide assembly to divert a selected article to another one of two more recirculation targets by alternating recirculation targets in a round robin sequence.

14. A recirculation sortation conveyor comprising:
an elongate frame comprising a pair of lateral side frames;
an endless apron supported for longitudinal movement on the elongate frame to define a top conveying run and a bottom return run and positioned downstream of a linear sortation conveyor to receive at an offset lateral position a train of articles that are not diverted by the linear sortation conveyor;
more than one pusher received for lateral movement across the endless apron transverse to the longitudinal movement, each pusher having a pin extending below the top conveying run;
a pin guide assembly coupled between the elongate lateral frames, upwardly presented to selectively receive the pin of respective more than one pusher, and comprising:
an upstream pre-sort section that positions the articles selectively from the offset lateral position to an opposite lateral position of the top conveying run;
two or more recirculation sortation conveyors positioned downstream of the recirculation sortation conveyor respectively to receive articles presorted to one of the offset lateral position and the opposite lateral position;
a sortation controller comprising:
a device interface in electrical communication with one of a sortation controller of the linear sortation conveyor and an imaging device to receive position information of the train of articles inducted onto the endless apron; and
a processor subsystem in communication with the pin guide assembly and the device interface, wherein the processor subsystem configures the recirculation sortation conveyor to:
determine whether a first one of the two or more recirculation sortation conveyors has sufficient headroom gap to receive an article; and
in response to determining that the first one of the two or more recirculation sortation conveyors does not have sufficient headroom gap to receive an article, configure the pin guide assembly to divert a selected article to another one of three more recirculation targets; and
one or more divert targets positioned respectively along a selected lateral side of the elongate frame to receive articles diverted by more than one pusher from the top conveying run of the endless apron and to convey the received article onto a selected one of a gaylord container, a chute, and one of the two or more recirculation sortation conveyors;
wherein the pin guide assembly comprises a downstream divert section that selectively diverts the articles to the assigned divert target.

15. The recirculation sortation conveyor of claim 14, wherein the processor subsystem configures the recirculation sortation conveyor to:
determine that the linear sortation conveyor has initiated a stop; and
in response to determining that the linear sortation conveyor has initiated a stop, determining that a default recirculation sortation conveyor has insufficient headroom gap.

16. The recirculation sortation conveyor of claim 14, wherein the processor subsystem configures the recirculation sortation conveyor to configure the pin guide assembly to divert a selected article to another one of the three or more recirculation targets by alternating recirculation targets in a round robin sequence.

17. The recirculation sortation conveyor of claim 14, further comprising a position detection system to detect a relative longitudinal position of a selected article on the top conveying run of the endless apron, wherein the sortation controller adjusts selection of one or more reset pushers to compensate for the detected relative longitudinal position.

18. The recirculation sortation conveyor of claim 17, wherein the position detection system comprises a machine vision system that detects a geometric shape having an orientation and relative distance to the one or more reset pushers.

19. A material handling system comprising:
a linear sortation conveyor that operates at a longitudinal operating speed and that receives articles, the linear sortation conveyor comprising:
an elongate frame comprising a pair of lateral side frames;
an endless apron supported for movement on the elongate frame to define a top conveying run and a bottom return run;
more than one pusher received for lateral movement across the endless apron;
more than one divert conveyor positioned respectively along at least one lateral side of the elongate frame to receive articles diverted by one or more pushers from the top conveying run of the endless apron;
a plurality of switches that selectively diverts articles to one of a plurality of divert locations;
more than one switch associated with respective divert locations associated with the more than one divert conveyor;
more than one divert guide path, each respective divert guide path of the more than one divert guide path disposed downstream of a respective associated more than one switch to receive a selected pusher diverted by a selected switch into the selected divert guide path to divert a selected article, wherein each respective divert guide path comprises an arcuate portion having a continuously increasing slope without a breakpoint to laterally accelerate the diverted article without an abrupt initial force being applied; and
a recirculation sortation conveyor that dynamically recirculates articles that are not diverted by the linear sortation conveyor of the material handling system, the recirculation sortation conveyor comprising:
an elongate frame comprising a pair of lateral side frames;
an endless apron supported for longitudinal movement on the elongate frame to define a top conveying run and a bottom return run and positioned downstream of the linear sortation conveyor to receive at an offset lateral position a train of articles that are not diverted by the linear sortation conveyor;
more than one pusher received for lateral movement across the endless apron transverse to the longitudinal movement, each pusher having a pin extending below the top conveying run;
a pin guide assembly coupled between the pair of lateral side frames, upwardly presented to selectively receive the pin of the respective more than one pusher, and comprising an upstream pre-sort section that positions the articles selectively from the offset lateral position to an opposite lateral position of the top conveying run; and
two or more recirculation sortation conveyors positioned downstream of the recirculation sortation conveyor respectively to receive articles presorted to one of the offset lateral position and the opposite lateral position;
a scanner positioned to detect position and identifying indicia of a train of articles conveyed onto the linear sortation conveyor; and
a sortation controller in communication with a warehouse execution system, the scanner, the linear sortation conveyor, and the recirculation sortation conveyor, and configured to execute computer-readable instructions on a processor to configure the material handling system to:
scan the train of articles conveyed onto the linear sortation conveyor;
communicate the identifying indicia to the warehouse execution system and receive an assigned divert location for each article; switch a selected divert switch for an assigned divert location for each article;
determine whether any article was not diverted on the endless apron; and
in response to determining whether any article was not diverted on the endless apron, assign the article to one of two or more recirculation sortation conveyors and communicate the assignment to the recirculation sortation conveyor, wherein target operating speed of the linear sortation conveyor is between 650 to 700 feet per second.

20. The material handling system of claim 19, wherein the recirculation sortation conveyor further comprises:
one or more divert targets positioned respectively along a selected lateral side of the elongate frame to receive articles diverted by one or more pushers from the top conveying run of the endless apron and to convey the received article onto a selected one of a gaylord container, a chute, and one of the two or more recirculation sortation conveyors; and
the pin guide assembly comprising a downstream divert section that selectively diverts the articles to the assigned divert target.

21. The material handling system of claim 19, wherein the sortation controller:
determines an operating speed of the linear sortation conveyor; and
directs the recirculation sortation conveyor to match the operating speed of the linear sortation conveyor.

\* \* \* \* \*